United States Patent [19]
Peterson et al.

[11] Patent Number: 5,957,699
[45] Date of Patent: Sep. 28, 1999

[54] REMOTE COMPUTER-ASSISTED PROFESSIONALLY SUPERVISED TEACHING SYSTEM

[75] Inventors: Bret E. Peterson, Lafayette; William M. Jenkins, Pacifica; Michael M. Merzenich, San Francisco, all of Calif.; Paula Tallal, Lumberville, Pa.; Steven L. Miller, Pacifica, Calif.

[73] Assignee: Scientific Learning Corporation, Berkeley, Calif.

[21] Appl. No.: 08/995,680

[22] Filed: Dec. 22, 1997

[51] Int. Cl.⁶ ...................................................... G09B 3/00
[52] U.S. Cl. .......................... 434/350; 434/118; 434/362; 434/236; 706/927
[58] Field of Search ........................... 434/118, 236–238, 434/247, 307 R, 322, 323, 335, 350, 359, 362, 365; 382/164, 191, 318; 706/927; 705/1, 10; 707/517, 530; 600/300, 544, 545; 128/905, 920; 623/66; 482/900–903

[56] References Cited

U.S. PATENT DOCUMENTS

| | | | |
|---|---|---|---|
| 4,895,518 | 1/1990 | Arnold et al. ............................ | 434/118 |
| 5,035,625 | 7/1991 | Munson et al. ...................... | 434/362 X |
| 5,267,865 | 12/1993 | Lee et al. . | |
| 5,302,132 | 4/1994 | Corder . | |
| 5,306,154 | 4/1994 | Ujita et al. .......................... | 434/323 X |
| 5,387,104 | 2/1995 | Corder . | |
| 5,424,945 | 6/1995 | Bell ............................................ | 705/1 |
| 5,437,555 | 8/1995 | Ziv-El . | |
| 5,441,415 | 8/1995 | Lee et al. . | |
| 5,466,159 | 11/1995 | Clark et al. .............................. | 434/322 |
| 5,590,360 | 12/1996 | Edwards . | |
| 5,597,312 | 1/1997 | Bloom et al. ........................... | 434/362 |
| 5,692,906 | 12/1997 | Corder . | |
| 5,711,671 | 1/1998 | Geeslin et al. . | |
| 5,722,418 | 3/1998 | Bro ......................................... | 600/545 |
| 5,727,951 | 3/1998 | Ho et al. . | |
| 5,754,746 | 5/1998 | Ho et al. . | |
| 5,779,486 | 7/1998 | Ho et al. ................................. | 434/353 |
| 5,813,863 | 9/1998 | Sloane et al. ........................... | 434/236 |
| 5,823,788 | 10/1998 | Lemelson et al. ...................... | 434/350 |
| 5,836,304 | 11/1998 | Kellington et al. ..................... | 600/300 |

*Primary Examiner*—Joe H. Cheng
*Attorney, Agent, or Firm*—James D. Ivey

[57] ABSTRACT

A student user of a client computer system uses a teaching process to promote development of cognitive skills of the student and a supervisor uses a second client computer to remotely monitor the progress of the student. The teaching process presents various types of stimuli to the student and records student response data which correspond to the stimuli. In addition, the teaching process forms evaluation data from the student response data where the evaluation data represents a correlation between the student response data for respective stimuli and predetermined correct response data for respective stimuli. Furthermore, the teaching process modifies its own behavior according to the evaluation data to thereby tailor the behavior of the teaching process to the cognitive abilities of the student. The student response data is uploaded to a global student database which is accessible to a supervisor user. The supervisor requests student response data from the global student database and presents the student response data to the supervisor for analysis. The supervisor can use such analysis in direct consultation with the student at a later date or can recommend changes in the behavior of the teaching process to more effectively encourage development of the cognitive ability of the student.

17 Claims, 13 Drawing Sheets

MACHINE RECORD 1002
- IDENTIFIER 1004
- SITE IDENTIFIER 1006
- NAME 1008
- RAM SIZE 1010
- LOGICAL RAM SIZE 1012
- ROM SIZE 1014
- ROM VERSION 1016
- SOUND FLAGS 1018
- MACHINE TYPE 1020
- SYSTEM VERSION 1022
- CPU 1024
- DATE ADDED 1026
- LAST UPLOAD 1028

FIG. 10

CLIENT RECORD 902
- IDENTIFIER 904
- CERTIFIED IDENTIFIER 906
- FIRST NAME 908
- LAST NAME 910
- GENDER 912
- DATE OF BIRTH 914
- DATE ADDED 916
- SITE IDENTIFIER 918
- HOME SITE IDENTIFIER 920
- DATE LICENSE RECEIVED 922
- DATE PAYMENT RECEIVED 924
- DATE CLIENT HISTORY 926
- STATUS 928

FIG. 9

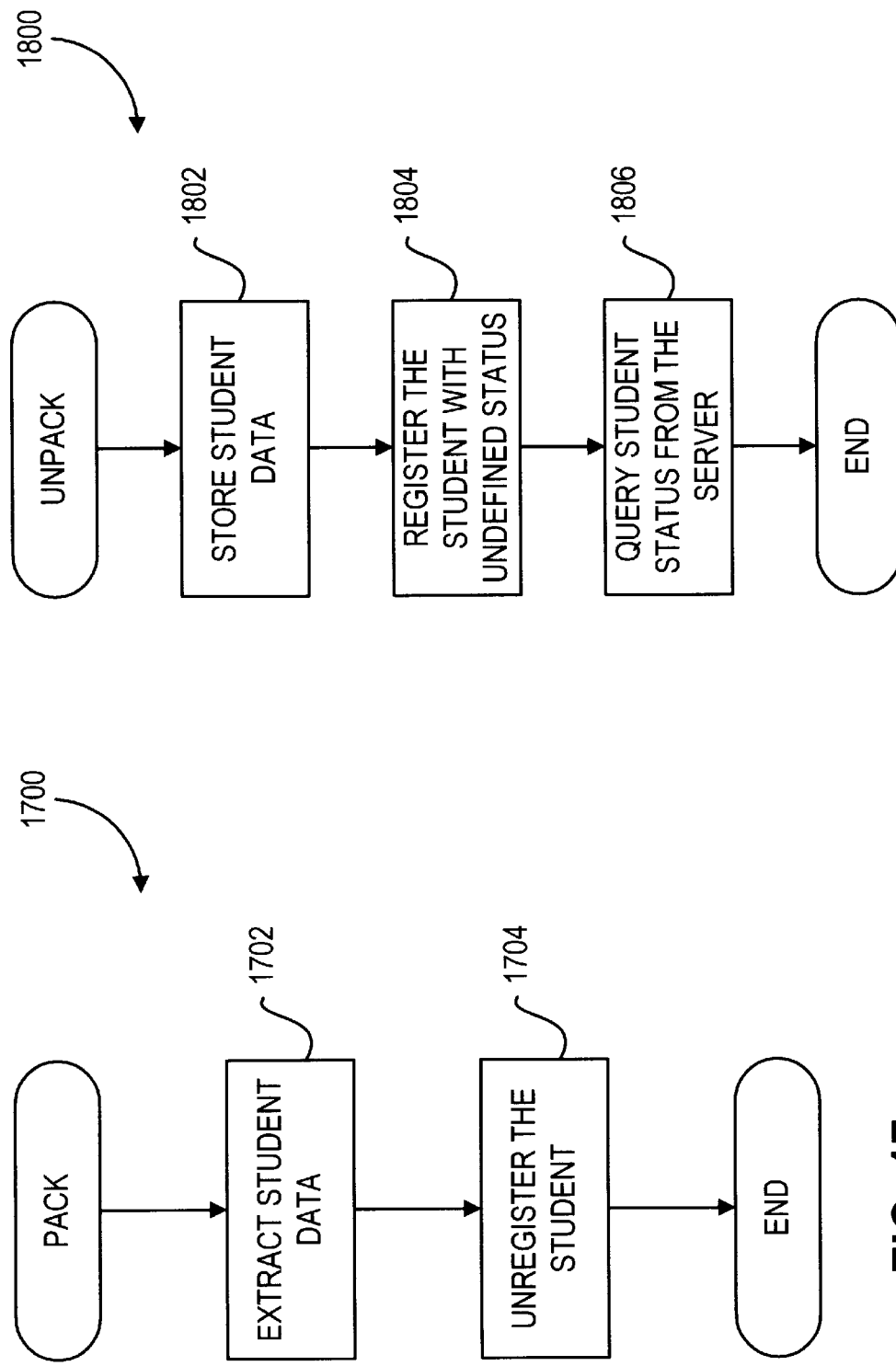

5,957,699

REMOTE COMPUTER-ASSISTED PROFESSIONALLY SUPERVISED TEACHING SYSTEM

CROSS REFERENCE TO RELATED APPLICATIONS

This application is related to co-pending (1) U.S. Patent application Ser. No. 08/995,964 (Atty Docket No.: P-2076/702C2), entitled "Remote Computer-Assisted Compliance Monitoring System," and (2) U.S. Patent application Ser. No. 08/995,497 (Atty Docket No.: P-2071/702C1), entitled "Migration Mechanism for User Data from One Client Computer System to Another," both of which are filed concurrently herewith and which are both incorporated herein by reference in their entirety for all purposes.

FIELD OF THE INVENTION

The present invention relates to computer-assisted teaching systems and, in particular, to a particularly effective mechanism by which a teacher, supervisor, or therapist can remotely monitor performance of a student or patient and control performance of the computer-assisted teaching system.

BACKGROUND OF THE INVENTION

For many years, computers have been used in an educational capacity. However, computer-assisted teaching systems are tackling even larger developmental challenges to the point at which supervision by a human teacher, supervisor, or clinical psychologist is required. Such supervision includes (i) monitoring the performance of a student in terms of correctly performing tasks specified by the computer-assisted teaching system and maintaining a prescribed schedule, (ii) configuring the computer-assisted teaching system to adapt to the particular needs and abilities of the student, and (iii) using feedback from the computer-assisted teaching system to direct supplementary instruction.

Sometimes, physical presence of a supervisor at the site at which a student uses a computer-assisted teaching system is impractical. For example, such is the case in computer-assisted teaching systems in which highly-qualified clinical psychologists are required and in which relatively few students at any particular site require use of the computer-assisted teaching system. In such cases, the ability of a supervisor to supervise use of the computer-assisted teaching system from a remote location is particularly advantageous.

SUMMARY OF THE INVENTION

In accordance with the present invention, a student user of a client computer system uses a teaching process to promote development of cognitive skills of the student, and a supervisor uses a second client computer to remotely monitor the progress of the student. The teaching process presents various types of stimuli to the student and records student response data which correspond to the stimuli. In addition, the teaching process forms evaluation data from the student response data where the evaluation data represents a correlation between the student response data for respective stimuli and predetermined correct response data for respective stimuli. Furthermore, the teaching process modifies its own behavior according to the evaluation data to thereby tailor the behavior of the teaching process to the cognitive abilities of the student.

The student response data is uploaded to a global student database which is accessible to a supervisor user. The supervisor requests student response data from the global student database and presents the student response data to the supervisor for analysis. The supervisor can use such analysis in direct consultation with the student at a later date or can recommend changes in the behavior of the teaching process to more effectively encourage development of the cognitive ability of the student. Accordingly, the supervisor can evaluate progress of a relatively large number of students by reference to the evaluation of the students. In addition, the evaluation data is retrieved by the supervisor from a global student database through a wide area computer network. As a result, the supervisor can review and evaluate the progress of the students notwithstanding significant geographic separation of some or all of the students from the supervisor.

BRIEF DESCRIPTION OF THE DRAWINGS

FIG. 9 is a block diagram of a client record representing a student within a student response database of FIG. 2.

FIG. 10 is a block diagram of a machine record representing a student client computer system of FIG. 2.

FIG. 17 is a logic flow diagram illustrating packing of student user data for migration from one student client computer system to another.

FIG. 18 is a logic flow diagram illustrating unpacking of student user data for migration from one student client computer system to another.

DETAILED DESCRIPTION

Figure 1:
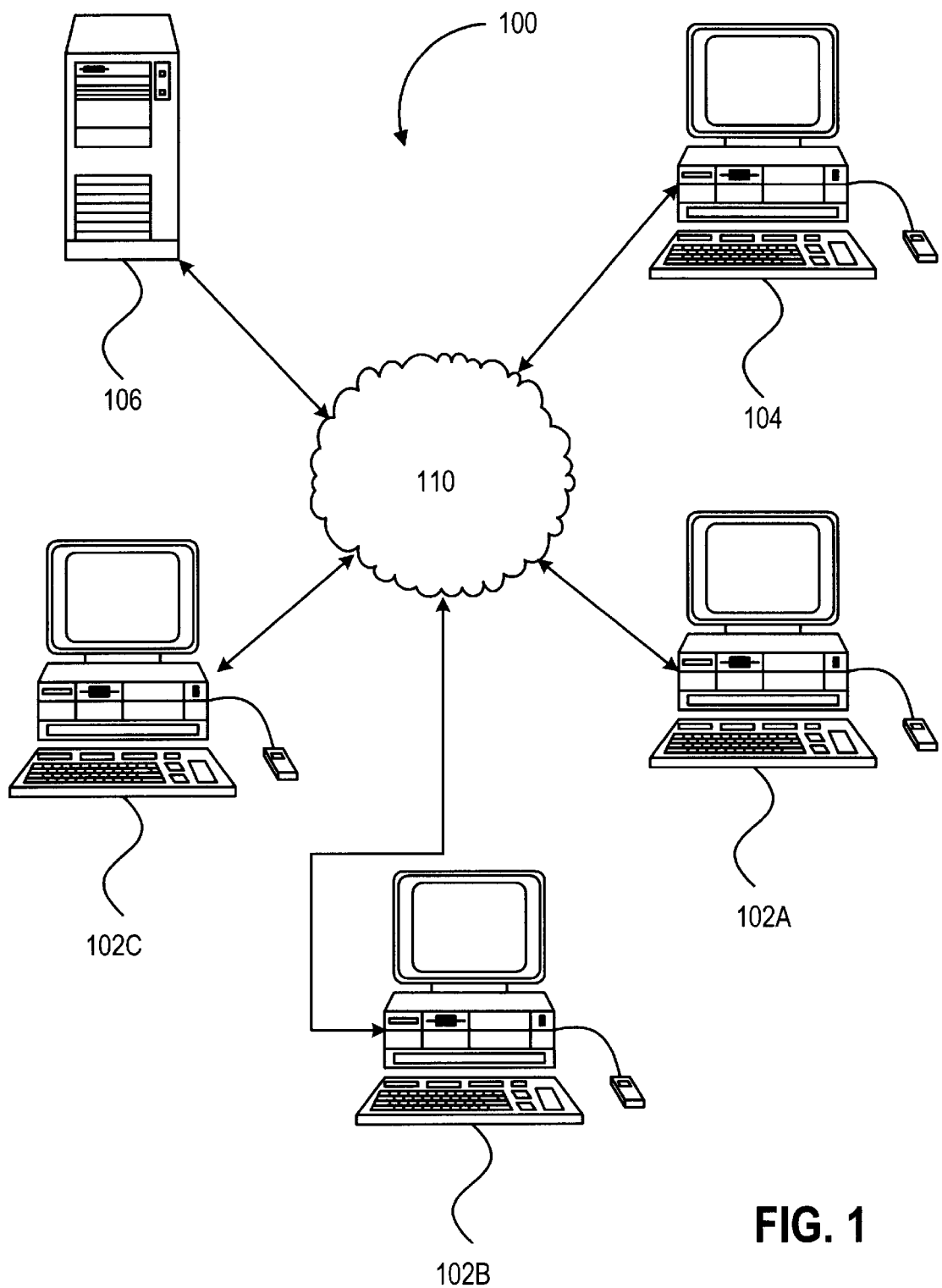
FIG. 1 is a block diagram of a server computer system, a number of student client computer systems, and a supervisor client computer system connected to one another through a computer network.

In accordance with the present invention, a student user of a student client computer system 102 (FIG. 2) uses a teaching process 202 to promote development of cognitive skills of the student, and a supervisor uses a supervisor client computer system 104 to remotely monitor the progress of the student and to adjust supplementary instruction accordingly.

A computer-assisted teaching system 100 (FIG. 1) includes a student client computer system 102A in which a teaching process executes. A human student receives and responds to stimuli using user interface techniques in a manner described more completely below. Computer-assisted teaching system 100 also includes a supervisor client computer system 104 in which analysis tools can be used by a human supervisor to monitor responses of the student. A server computer system 106 compiles data representing recorded responses of the student and all other students using other student client computer systems (e.g., client computer systems 102B–C) and serves as a gateway between supervisor client computer system 104 and student client computer systems 102A–C. Server computer system 106, student client computer system 102A–C, and supervisor client computer system 104 are coupled to, and communicate with one another through, a computer network 110. In one embodiment, computer network 110 is the Internet. The operation of, and interaction between, server computer system 106, student client computer systems 102A–C, and supervisor client computer system 104 are described more completely in the context of FIG. 2.

Student client computer system 102A includes a teaching process 202 which provides a human student with stimuli and receives user-generated signals in response to the stimuli. A correct response for each stimulus is predetermined within teaching process 202. Teaching process 202 records all received user-generated signals in a student response database 204. In addition, teaching process 202 interprets the received user-generated signals as correct or incorrect responses to stimuli and stores the interpretations of the user-generated signals in student response database 204. Incorrect responses are further categorized as misses or false alarms in this illustrative embodiment. A miss is an incorrect response by the student to a valid stimulus. A false alarm is any response by the student in the absence of a valid stimulus.

In one embodiment, a response is determined to correspond to a valid stimulus during a predetermined amount of time, e.g., one-half second, immediately following presentation of the valid stimulus to the student. For example, teaching process 202 can repeatedly play "chu" and, at some random point, play "shu" instead. In response, the student is expected to signal recognition of the transition from "chu" to "shu" using user-interface techniques. If the student fails to signal recognition of such a transition in response to playing "shu" in place of "chu" within the predetermined period of time, the student response is interpreted and recorded as a miss. If the student signals recognition of such a transition when "shu" has not been played, the student response is interpreted and recorded as a false alarm. Of course, if the student signals recognition of such a transition in response to playing "shu" in place of "chu" within the predetermined amount of time, the student response is interpreted and recorded as a hit.

As described more completely below with respect to this illustrative embodiment, stimuli and corresponding predetermined correct responses are organized into one or more games, each of which has a number of categories. Each of the categories is further divided into levels. Each game is generally designed to challenge a particular cognitive skill of the student, and each category is generally designed to challenge the cognitive skill in a particular way. In addition, each level specifies generally a degree to Vehicle the cognitive skill is challenged. For example, one game challenges the student to distinguish close phonemes, a particular category challenges the student to distinguish "chu" from "shu," and a particular level specifies the way in which "chu" and "shu" are presented to the student, e.g., (i) the speed at which "chu" and "shu" are presented, (ii) the delay between presenting each phoneme, and (iii) the degree to which "chu" and "shu" are synthesized to be more easily distinguished by a listening impaired student. Such synthesis of speech is described, for example, in co-pending U.S. Patent application Ser. No. 08/982,189 filed Dec. 17, 1997 by William M. Jenkins et al. and entitled "Method and Device for Training of Sensory Perceptual System in LLI Subjects" which is incorporated herein in its entirety by reference. In addition, the games of teaching process 202 in this illustrative embodiment are described more completely in the referenced co-pending U.S. Patent Application and that description is incorporated herein by reference.

Furthermore, student response database 204 stores data representing the pace at which the student responds to stimuli as recorded by teaching process 204. In short, student response database 204 records various types of information regarding the nature of the responses of the student to the stimuli presented to the student by teaching process 202.

Student Response Database 204

Student response database 204 includes a number of student records, e.g., client record 902 (FIG. 9), which represent individual student users of teaching process 202. In addition, student response database 204 includes data representing client computer system 102, e.g., machine record 1002 (FIG. 10). Student response database 204 includes data files and data entries, such as data file 1102 (FIG. 11) and data entry 1202 (FIG. 12), which collectively represent the responses of the subject student during execution of teaching process 202.

Figure 2:
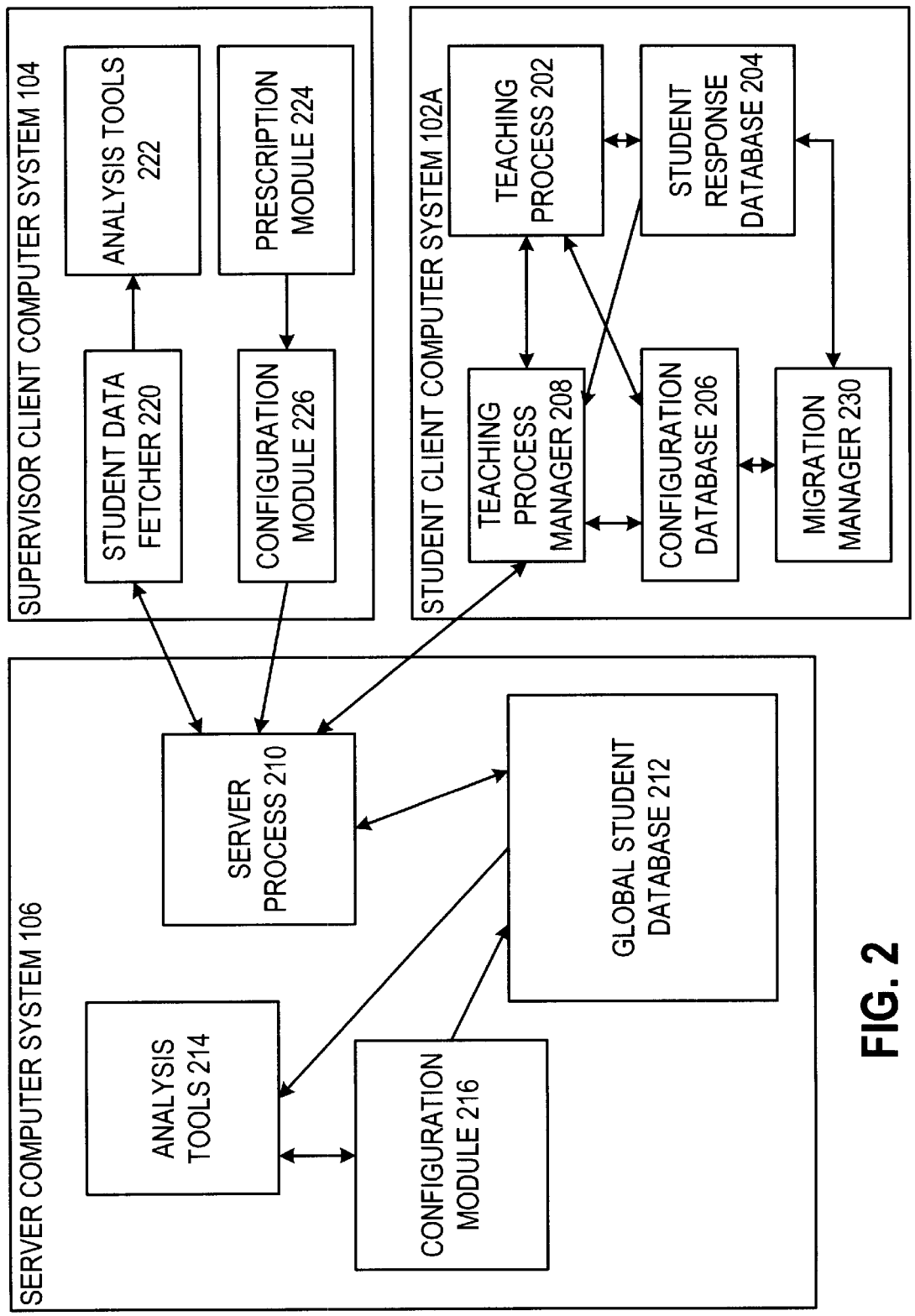
FIG. 2 is a block diagram of the server computer system, student client computer system, and supervisor client computer system of FIG. 1 in greater detail.

Client record 902 includes a number of fields, e.g., fields 904–928, which collectively represent a student user of client computer system 102 (FIG. 2). As used herein, a field is a collection of data which represents a particular piece of information. Client record 902 includes (i) an identifier field 904, (ii) a certified identifier field 906, (iii) a first name field 908, (iv) a last name field 910, (v) a gender field 912, (vi) a day of birth field 914, (vii) a date added field 916, (viii) a site identifier field 918, (ix) a home site identifier field 920, (x) a date license received field 922, (xi) a date payment received field 924, (xii) a date client history field 926, and (xiii) a status field 928.

Identifier field 904 contains data which uniquely identifies a particular student user of client computer system 102 (FIG. 2). In the context of client record 902 (FIG. 9), the student user of client computer system 102 (FIG. 2) represented by client record 902 (FIG. 9) is referred to as the subject student. Certified identifier 906 contains data which uniquely identifies the supervisor who monitors the use of teaching processor 202 (FIG. 2) by the subject student.

Fields 908–914 (FIG. 9) represent general information about the subject student. First name field 908 and last name field 910 contain data which specify the first and last name, respectively, of the subject student. Gender field 912 contains data representing the gender of the subject student. Date of birth field 914 contains data representing that date of birth of the subject student.

Date added fielded 916 contains data representing date on which client record 902 is created. Site identifier field 918 contains data which uniquely identifies a site which includes one or more student client computer systems such as student client computer system 102 (FIG. 2). The student client computer systems of a site are administered by a single person or organization. Home site identifier field 920 (FIG. 9) contains data which represents an alternative site for the subject student, e.g., a computer system set tip in the home of the subject student. The home site is considered a remote part of the site identified in site identifier field 918. Fields 922–928 store data used for financial accounting and administration of the subject student.

Machine record 1002 (FIG. 10) represents student client computer system 102 (FIG. 2) and includes fields 1004–1028 (FIG. 10). Specifically, machine record 1002 includes (i) an identifier field 1004, (ii) a site identifier field 1006, (iii) a name field 1008, (iv) a RAM size field 1010, (v) a logical RAM size field 1012, (vi) a ROM size field 1014, (vii) a ROM version field 1016, (viii) a sound flags field 1018, (ix) a machine type field 1020, (x) a system version field 1022, (xi) a CPU field 1024, (xii) a date added field 1026, and (xiii) a last uploaded field 1028.

Identifier field 1004 contains data which uniquely identifies student client computer system 102 (FIG. 1) among computer systems of computer network of 110. Site identifier 1006 (FIG. 10) contains data uniquely identifying a site which includes client computer system 102 and perhaps other client computer systems. A site is generally a collection of one or more student client computer systems under the control of a single administrator. Name field 1008 contains data which identifies student client computer system 102 (FIG. 1) to student users of student client computer system 102.

Fields 1010–1024 (FIG. 10) contain data representing the specific configuration and performance characteristics of student client computer system 102 (FIG. 1). Date added field 1026 (FIG. 10) contains data representing the date on which machine record 1002 is created. Last uploaded field of 1028 contains data specifying last date and time student records of student response data base 204 (FIG. 2) and configuration data base 206 were most recently uploaded to server computer system 106.

As described above, data file 1102 (FIG. 11) represents play of a particular game of teaching process 202 (FIG. 2) by the subject student on a particular day. Data file 1102 includes (i) an identifier field 1104, (ii) a client identifier field 1106, (iii) a game identifier 1108, (iv) a date recorded field 1110, (v) a date loaded field 1112, (vi) a flags field 1114, and (vii) a machine identifier field 1116.

Identifier field 1104 contains data uniquely identifying data file 1102 among all data files stored in student response database 204 (FIG. 2). Client identifier field 1106 contains data identifying the subject student as identified by identifier field 904 (FIG. 9) of client record 902. Multiple data files such as data file 1102 (FIG. 11) can correspond to the same student and therefore contain identical data in respective instances of client identifier field 1106. Game identifier field 1108 contains data identify in, a particular game to which data file 1102 pertains. Multiple data files can correspond to the same game. In the context of data file 1102, the game identified by game identifier field 1108 is referred to herein as the subject game.

Figure 11:
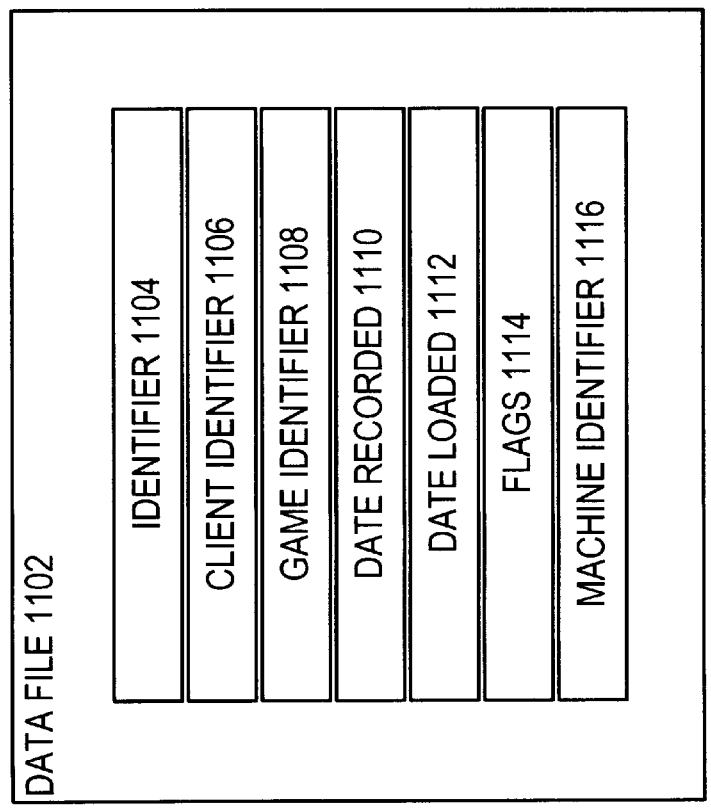
FIG. 11 is a block diagram of a data tile of the student response database of FIG. 2.

Date recorded field 1110 contains data which specifies the date on which the subject student played the game as recorded in data file 1102. Date loaded field 1112 contains data which specifies the date on which data file 1102 is created and entered into student response database 204 (FIG. 2). Flags field 1114 (FIG. 11) contains a number of flags, each of which has one of two possible values. The flags of lags field 114 specify which types of data are represented in data entries, e.g., data entry 1202 (FIG. 12), associated with data file 1102 (FIG. 11). Such types include hits, misses, false alarms, and reaction times, for example. Machine identifier field 1116 contains data representing the particular computer system on which the subject user plays the subject game as represented by data file 1102. In this illustrative example, machine identifier field 1116 identities student client computer system 102 (FIG. 2).

Figure 12:
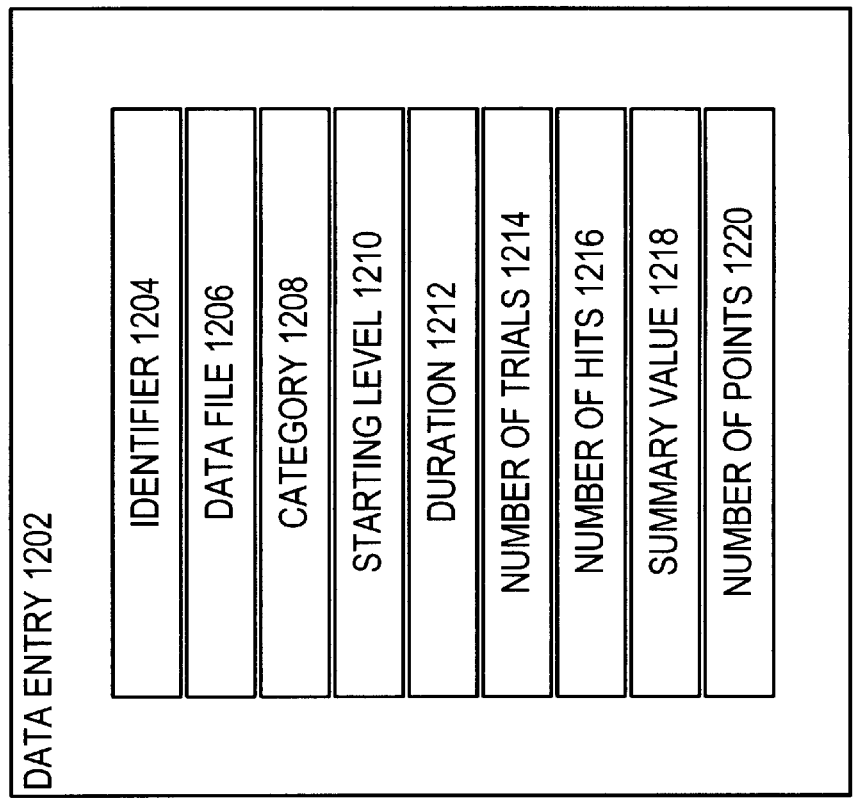
FIG. 12 is a block diagram of a data entry of the student response database of FIG. 2.

Each category of a play session in which the subject student plays the subject game is represented by a respective data entry such as data entry 1202 (FIG. 12). Data entry 1202 includes a number of fields, namely, (i) an identifier field 1204, (ii) a data file field 1206, (iii) a category field 1208, (iv) a starting level field 1210, (v) a duration field 1212, (vi) a number of trials field 1214, (vii) a number of hits field 1216, (viii) a summary value field 1218, and (ix) a number of points field 1220.

Identifier field 1204 contains data uniquely identifying data entry 1202 from all other data entries stored in student response database 204 (FIG. 2). Data file field 1206 (FIG. 12) contains data identifying data file 1102 (FIG. 11) as the data file to which data entry 1202 (FIG. 12) pertains. The identifying data stored in data file field 1206 corresponds to identifying data stored in identifier field 1104 (FIG. 11) of data file 1102.

Category field 1208 (FIG. 12) contains data identifying the category of the subject game to which data entry 1202 pertains. In the context of data entry 1202, the category identified by category field 1208 is called the subject category. Starting level field 1210 contains data specifying the level of the subject category at which the subject student started the session represented by data entry 1202, which is referred to as the subject session in the context of data entry 1202. Duration field 1212 contains data specifying the amount of time during which the subject student played the subject category. Number of trials field 1214 contains data representing the number of time the subject student was presented with stimuli in the subject category. Number of hits field 1216 contains data representing the number of time the subject student responded correctly to presented stimuli during the subject category. Summary value field 1218 contains data which encapsulates performance by the student thus far in the current play of the subject category. Number of points field 1220 contains data representing a number of game rewards acquired by the subject student during play of the subject category. In one embodiment, the game rewards serve as motivation for students playing the games and are currency in a token economy.

Figure 13:
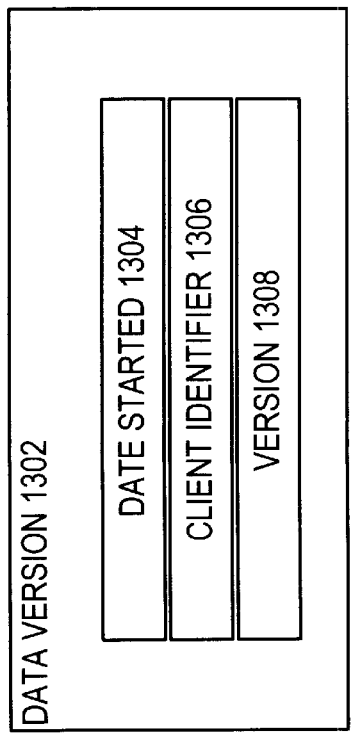
FIG. 13 is a block diagram of a data version of the student response database of FIG. 2.
Figure 14:
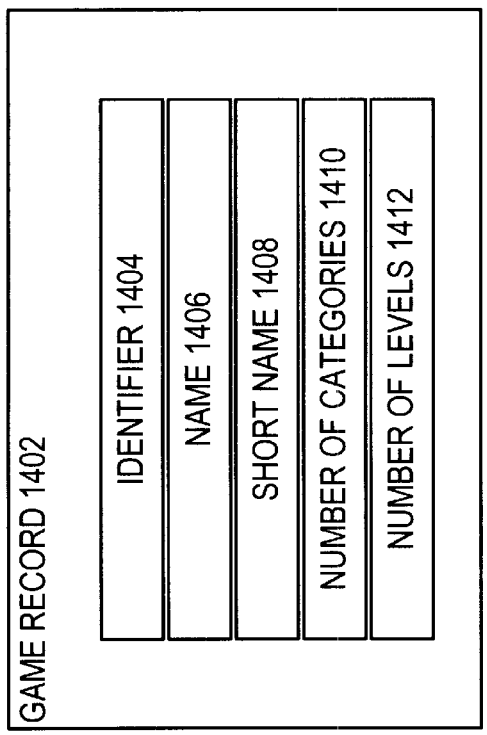
FIG. 14 is a block diagram of a game record of the configuration database of FIG. 2.
Figure 15:
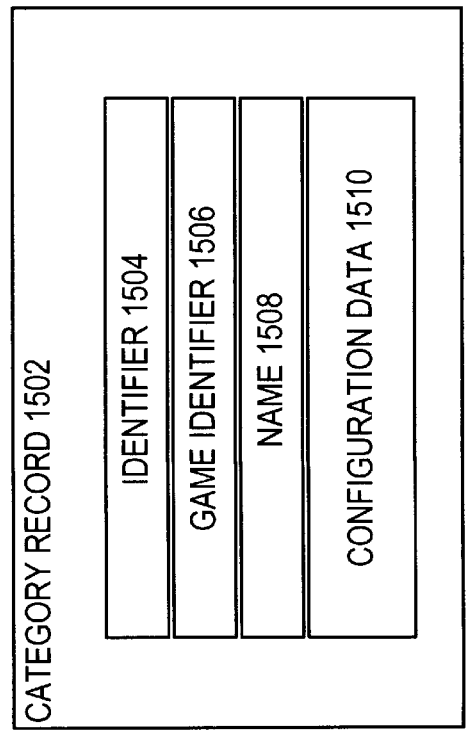
FIG. 15 is a block diagram of a category record of the configuration database of FIG. 2.
Figure 16:
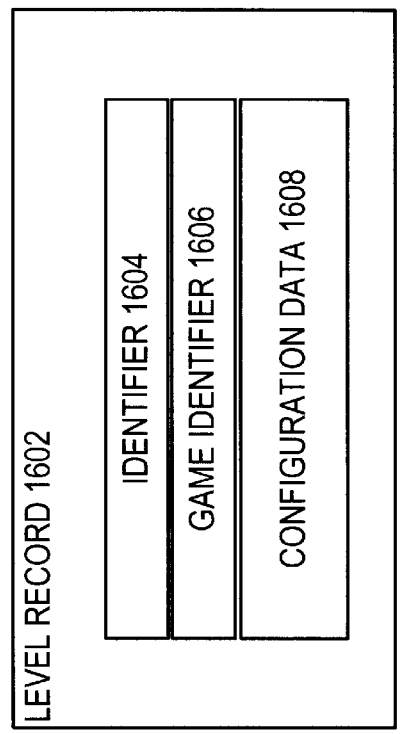
FIG. 16 is a block diagram of a level record of the configuration database of FIG. 2.

Student response database 204 also includes a number of data version records such as data version 1302 (FIG. 13), each of which represents the version of each software component of the games played by the subject student. In the context of data version 1302, the subject version is the version represented by data version 1302. Data version 1302 includes a date started field 1304, a client identifier 1306, and a version field 1308. Date started field 1304 contains data specifying the date on which the subject student started using the subject version. Client identifier field 1306 contains data identifying the subject student. Version field 1308 contains data identifying the subject version.

Thus, student response database 204 (FIG. 2) includes data representing responses of one or more students to stimuli presented by teaching process 202. As described more completely below, such data can be used remotely by a supervisor to monitor and evaluate the development of cognitive skill by the students.

As described more completely below, student response data for all students which use teaching processes such as teaching process 202 are stored in a global student database 212. Furthermore, the student response data stored in global student database 212 is accessible by supervisors who monitor a student's progress in developing cognitive skills through teaching process 202, for example. Therefore, teaching process manager 208 periodically uploads student response data from student response database 204 to server process 210 for storage in global student database 212. In one embodiment, such uploading takes place in response to a request by the student, or by a system administrator managing use of student client computer system 102 by the student, using graphical user interface techniques, that student response data pertaining to the student is uploaded. Since network 110 (FIG. 1) can be slow and/or busy, allowing the user to determine a desirable time to perform a potentially lengthy upload of student response data avoids annoying and inconvenient delays in the execution of teaching process 202.

When teaching process manager 208 uploads student response data for a particular student, e.g., the subject student, teaching process manager 208 retrieves the data from student response database 204 and packages the data for transport through computer network 110 (FIG. 1). Specifically, teaching process manager 208 (FIG. 2) retrieves from student response database 204 client record 902 (FIG. 9) along with each data file (e.g., data file 1102—FIG. 11), data entry (e.g., data entry 1202—FIG. 12), and data version (e.g., data version 1302—FIG. 13) which correspond to client record 902 (FIG. 9). Teaching process manager 208 (FIG. 2) determines which data files correspond to client record 902 (FIG. 9) by reference to data stored in client identifier field 1106 (FIG. 11) of each data file. Teaching process manager 208 (FIG. 2) determines which data entries correspond to client record 902 (FIG. 9) by reference to data stored in data file identifier field 1206 (FIG. 12) of each data entry. If data stored in data file identifier field 1204 identifies a data file which in turn contains data in client identifier field 1106 (FIG. 11) which identifies client record 902 (FIG. 9), then data entry 1202 (FIG. 12) corresponds to client record 902 (FIG. 9). Teaching process manager 208 (FIG. 2) determines which data versions correspond to client record 902 (FIG. 9) by reference to data stored in client identifier field 1306 (FIG. 13) of each data version.

Teaching process manager 208 (FIG. 2) forms a consolidated representation of the retrieved records, files, entries, and versions. Such a consolidated representation is complete and self-contained, i.e., does not require extrinsic information to resolve references between items. Such is true since each item includes a field which specifies the item's identifier. For example, client record 902 (FIG. 9) includes identifier field 904 which contains the identifier of client record 902, and that identifier is used by data file 1102 (FIG. 11) and data version 1302 (FIG. 13) to identify client record 902 (FIG. 9) Similarly, data file 1102 (FIG. 11) stores its own identifier in identifier field 1104; and data entry 1202 (FIG. 12) stores its own identifier in identifier field 1204. Accordingly, client record 902 (FIG. 9), data file 1102 (FIG. 11), data entry 1202 (FIG. 12), and data version 1302 (FIG. 13) can be removed from the particular address space and execution state of student client computer system 102 (FIG. 2) and still be fully specified with all references fully resolved and unaffected by transportation to server computer system 106.

Upon receipt by server process 210, server process 210 stores data from the consolidated representation in global student database 212. Global student database 212 includes the data from the consolidated representation in a relational database having the structure described above with respect to FIGS. 9–16 and further includes flat files which store redundant information from the consolidated representation. In one embodiment, the flat files are disk files which store records such as those shown in FIGS. 9–16 in the form of lines of ASCII text. Since the flat files are ASCII text data files in this illustrative embodiment, transportation of the flat files through computer network 110 can be accomplished by any of a number of well-known and conventional mechanisms including, for example, the known and conventional file transfer protocol (FTP).

To facilitate accurate analysis of student response data in the manner described below, frequent uploading of student response data is encouraged. In one embodiment, student response database 204 has sufficient space allocated for response data for a single student for a limited number of days, e.g., five days. When a student has not uploaded in the last five days during which teaching process 202 was used by the student, storage of further student response data in student response database 204 fails and teaching process 202 refuses to execute normally until the student uploads student response data from previous sessions with teaching process 202. When the student uploads the student response data from student response database 204, student response database 204 frees space for additional student response data for the student.

In one illustrative embodiment, the space is limited by storing each day's activity by a particular student as a flat file which is one of only five disk files with predetermined names used in a round-robin manner. As each flat file is uploaded to server computer system 106 (FIG. 1), the flat file is deleted from student client computer system 102A. At the start of each day's use of teaching process 202 (FIG. 2) by the student, a new flat file is created to store the response data corresponding to the student's use of teaching process 202 for that day. The new flat file has a predetermined file name according to the round robin scheme described above. If the predetermined file name is already in use, then all five predetermined file names are in use and the student is required to upload all five flat files before continuing with use of teaching process 202.

Configuration Database 206

As described above, configuration database 206 stores data which specifies components of the behavior of teaching process 202. Specifically, configuration database 206 includes game records, e.g., game record 1402 (FIG. 14), representing specific games of teaching process 202 (FIG. 2) and category records, e.g., category record 1502 (FIG. 15), representing specific categories of each game of teaching process 202 (FIG. 2).

Game record 1402 (FIG. 14) includes an identifier field 1404, a name field 1406, a short name field 1408, a number of categories field 1410, and a number of levels field 1412. Identifier field 1404 contains data which uniquely identifies the game represented by game record 1402 which is referred to herein as the subject game. Name field 1406 and short name field 1408 contain data which specify respective alternative identifying names of the subject game which are generally more suitable for representation to a user than is the identifying data stored in identification field 1404. Number of categories field 1410 contains data specifying the number of categories of the subject game. Number of levels field 1412 contains data specifying the number of levels of the subject game.

Category record 1502 (FIG. 15) represents specific behavior characteristics of the subject game of teaching process 202 (FIG. 2) for a particular category and includes an identifier field 1504, a game identifier field 1506, a name field 1508, and a configuration data field 1510. Identifier field 1504 contains data which uniquely identifies the category represented by category record 1502 which is referred to herein as the subject category. Game identifier field 1506 contains data identifying the subject game as the game to which the subject category pertains. Name field 1508 contains data which specifies an identifying name of the subject category which is generally more suitable for representation to a user than is the identifying data stored in identification field 1504. Configuration data field 1510 contains data specifying the particular behavior of the subject category, of the subject game within teaching process 202 (FIG. 2). The specific form and effect of configuration data stored in configuration data field 1510 is specific to the subject game. For example, if the subject game tests the student's ability to recognize specific sonic tones, the configuration data can specify the frequency and duration of the tone. Thus, each category of the subject game corresponds to a different tone which the student is to recognize.

Level record 1602 (FIG. 16) represents a specific level of difficulty for the subject game and includes an identification field 1604, a game identifier field 1606, and a configuration data field 1508. Identifier field 1604 contains data which uniquely identifies the level represented by level record 1602 which is referred to herein as the subject level. Game identifier field 1606 contains data identifying the subject game as the game to which the subject level pertains. Configuration data field 1608 contains data specifying the particular behavior of the subject level of the subject game within teaching process 202 (FIG. 2). The specific form and effect of configuration data stored in configuration data field 1510 is specific to the subject game. For example, in the illustrative example in which the subject game tests the student's ability to recognize specific sonic tones, the configuration data can specify an inter-stimulus interval (ISI). The ISI is the amount of time which is allowed to elapse between presentation of distinct stimuli to the student. Higher levels of the subject game typically have lower ISIs since the higher levels correspond to better cognitive abilities of the student. Thus, each level of the subject game corresponds to a different level of cognitive ability of the student.

Adaptation of Teaching Process 202

Teaching process 202 is adaptive in that teaching process 202 changes its own behavior in response to the nature of the students responses as represented in student response data 204. For example, if the student consistently achieves a predetermined level of proficiency in responding to stimuli of a particular game at a particular level for a particular category of the game, teaching process 202 increases the level, and therefore the level of difficulty, of the category. Specifically, teaching process 202 stores in student response database 204 a data entry, e.g., data entry 1202, for the student and stores in category field 1208 data identifying the category and stores in starting level 1210 data representing a higher level for which the student has not yet achieved the predetermined level of proficiency. In one embodiment, the predetermined level of proficiency is the level at which the student's responses match the predetermined correct responses for 80% of the stimuli presented to the student. The number of matching responses for the student for a particular level of a particular category is represented in number of hits field 1216. The number of stimuli presented to the student for the level of the category is represented in number of trials field 1214. In other embodiments, the level of proficiency can include consideration of other parameters of the responses of the student, including without limitation time for response to the stimuli and the number of false alarms.

In another, alternative embodiment, a three-up-one-down mechanism is used to adjust the level of difficulty of teaching process 202 to the cognitive ability of the student. Specifically, the level of difficulty is increased each time the student responds correctly to three consecutive stimuli and is decreased each time the student responds incorrectly to any stimulus. To avoid frustrating the student, teaching process 202 (FIG. 2) changes to a different game when the level of difficulty decreases a predetermined number of times during a single session of use of teaching process 202, e.g., eight times. A level record, e.g., level record 1602 (FIG. 16) records the highest level achieved by the student. When starting a new session of use of teaching process 202 (FIG. 2), for example on the next day, play of the same game begins several levels of difficulty below the highest level achieved previously to reinforce the cognitive skills of the student.

Thus, as the student achieves new levels of proficiency, representing increased cognitive ability of the student, the behavior of teaching process 202 adapts to further challenge the increased cognitive ability.

Local adaptation of teaching process 202, i.e., adaptation by teaching process 202 in response to responses of the student by use of student client computer system 102A, allows teaching process 202 to adapt immediately, to the particular needs and abilities of the student within a single execution of teaching process 202. However, in accordance with the present invention, teaching process 202 allows benefits from global adaptation. In global adaptation, a server process 210 monitors responses of the student user of student client computer system 102A and student users of other, analogous student client computer systems 102B–C (FIG. 1) and sends student client computer system 102 configuration data which adapts teaching process 202 (FIG. 2) to better serve and adapt to the particular needs and abilities of the student.

To enable global adaptation of teaching process 202, student client computer system 102A includes a teaching process manager 208 which accesses data stored in configuration database 206 and student response database 204 on behalf of server process 210. Specifically, teaching process manager 208 retrieves data from student response database 204 and from configuration database 206 and sends that data to server process 210 for storage in a global student database 212. Accordingly, global student database 212 stores, for each student user of computer-assisted teaching system 100 (FIG. 1), a record of student response data and configuration data. Thus, global student database 212 contains information regarding the use of teaching process 202 by a student user and the manner in which teaching process 202 has thus far adapted to the student's responses. Global student database 212 includes records and entries generally of the structure described above with respect to FIGS. 11–16.

In addition, teaching process manager 208 can receive configuration data from server process 210 for storage in configuration database 206. Such configuration data can include various flags and/or conditional variable settings to change the behavior of teaching process 202 in ways anticipated by component computer instructions of teaching process 202. Such configuration data can be, for example, configuration stored in configuration data field 1510 (FIG. 15) of category record 1502 and/or in configuration data field 1608 (FIG. 16) of level record 1602 to alter the behavior of teaching process 202 during play of the subject game within the subject category at the subject level.

In one embodiment, such configuration signals can also include computer instruction modules to replace or augment component computer instructions of teaching process 202 to change the behavior of teaching process 202 in ways not anticipated by the component computer instructions of teaching process 202. Specifically, teaching process manager 208 requests such computer instruction modules from server process 210 each time teaching process manager 208 sends data from student response database 204 to server process 210 for inclusion in global student database 212. Accordingly, teaching process manager 208 obviates re-establishment of the communication channel between teaching manager 208 and server process 210 already established for sending the student response data. The request can include data specifying the most recent versions of various components of teaching process 202. Server process 210 responds by (i) sending data indicating no new computer instruction modules are needed or (ii) sending the computer instruction modules. Teaching process manager 208 includes any received computer instruction modules into teaching process 202, superseding any previously included corresponding computer instruction modules. As a result, teaching process manager 208 enables server process 210 to change the behavior of teaching process 202.

A human supervisor using supervisor client computer system 104 can monitor interaction between various students and student client computer systems 102A–C regardless of geographical distances between the supervisor and the students. For example, a clinical psychologist can remotely monitor a student's progress by retrieving data from global student database 212. It is anticipated that use of teaching process 202 will typically be accompanied by direct consultation between the student and the supervisor periodically to augment the training and improved cognitive ability provided by teaching process 202. The supervisor can use student response data retrieved from global student database 212 to tailor such direct consultation to thereby maximize future progress of the student.

Supervisor client computer system 104 includes a student data fetcher 220 which retrieves from global student database 210 records for one or more students specified by the supervisor using graphical user interface techniques. Student data fetcher 220 forwards the received records to analysis tools 222 which are all or part of one or more computer processes executing within supervisor client computer system 104.

Analysis tools 222 provide the supervisor with a user interface by which the supervisor can request information regarding the progress of one or more specific students and can request that the information be processed and represented in a form in which the supervisor can properly analyze the progress of the specified students. Analysis tools 222 provide the supervisor with a wide variety of information presentation formats and statistical analysis tools such that the supervisor can determine the particular form in which the data is represented to best illuminate aspects of the responses of the specified students which the supervisor wishes to review and analyze.

Analysis tools 222 can display various types of reports for the supervisor. Such types include schedule reports, summary reports, history reports, assessment results reports, word game summary reports, and sound game summary reports.

Schedule reports display, in graphical form and/or in tabular textual form, data describing the dates and durations of sessions of a particular student with teaching process 202. In general, the supervisor specifies a particular student and a range of dates using graphical user interface techniques. Analysis tools 222 represent in report form the dates and durations of sessions by the specified student during the specified range of dates. Through such schedule reports, the supervisor can verify that the specified student is using teaching process 202 as much as prescribed and is therefore likely to obtain the full benefit in terms of improved cognitive ability as a result. Conversely, the supervisor can determine from such schedule reports that a particular student is failing to keep up with the prescribed schedule of use of teaching process 202 and is therefore less likely to benefit therefore. In the latter case, the supervisor can determine through direct consultation with the student the specific cause for failure of the student to maintain the prescribed schedule.

Summary reports display a summary of the performance of a particular student in the use of teaching process 202 in each category of each of the games. The summary of the performance of the student in a summary report provides the supervisor with a general indication of the progress made by the student without the detail provided by a history report as described below.

History reports display, in a graphical and/or tabular textual form, a complete history of a particular student's use of teaching process 202. History reports generally include all the information of a schedule report in combination with specific response data of the student. Such response data includes the specific stimuli presented to the student on each date on which the student used teaching process 202 and the corresponding response of the student. A history report gives the supervisor the entirety of the student's experience with teaching process 202 and enables the supervisor to perceive trends and chances in the cognitive ability of the student.

History reports can also be sorted by category and level. Therefore, responses of a particular student to various stimuli within a particular category or at a particular level can be more closely examined by the supervisor to detect trends in the cognitive ability of the student with specific stimuli, e.g., specific phonemes and/or specific grammatical constructs.

Assessment results reports display information pertaining to a particular student's performance during use of an assessment tool within teaching process 202. Teaching process 202 includes a number of assessment tools, one for each category of each game in one embodiment, which closely resemble categories of the games of teaching process 202. The student plays an assessment tool to establish a level of cognitive ability. By comparison, the games of teaching process 202 are designed to train, i.e., to improve the cognitive abilities of, the student. The student is typically required to play one or more assessment tools prior to beginning, and upon completion of, a course of training. In addition, a student can be asked to play one or more assessment tools periodically during the course of training. Through assessment results reports, the supervisor can measure the change in cognitive ability realized through the course of training.

Word game summary reports display for the supervisor word sentences used as stimuli to a particular student in a particular game. The supervisor selects the student and the game using graphical user interface techniques. In addition, the supervisor specifies whether the supervisor desires to see all sentences used as stimuli to the student in the game or to see only sentences for which the student responded incorrectly. Through a word game summary report, the supervisor can determine to which sentences the student has been exposed and which of those sentences are difficult for the student to understand.

Sound game summary reports display for the supervisor sounds, e.g., phonemes and frequency sweeps, used as stimuli to a particular student in a particular game. The sound game summary reports further display the student's progress in responding to the stimuli during a range of dates specified by the supervisor. The supervisor selects the student, the game, and the range of dates using graphical user interface techniques. Through a sound game summary report, the supervisor can determine to which sound stimuli the student has been exposed and which of those sound stimuli are difficult for the student to hear and identify.

The result of analysis by the supervisor of the student response data retrieved from global student database 212 is an opinion of the supervisor with respect to a course of action to maximize the progress of the student in the particular aptitudes exercised and enhanced by teaching process 202. Such a course of action can include (i) adaptation of the behavior of teaching process 202 to the particular needs and abilities of the student and/or (ii) independent consultation of the student.

As an example of the latter, the supervisor can determine that the student doesn't fully understand negation (e.g., responds incorrectly to the stimulus, "Point to the boy that is not smiling.") and can initiate independent consultation which focuses on improving the student's understanding of negation. Such independent consultation can include conventional tutoring and remediation.

With respect to adaptation of the behavior of teaching process 202, the supervisor can specify through prescription module a new starting level as represented in starting level 1201 (FIG. 12) of a particular category of a particular game. In this way, the supervisor can configure teaching process 202 (FIG. 2) to regress to a lower level of a particular category of a particular game to allow a student to exercise cognitive skills which are developing more slowly than anticipated or to skip ahead to a higher level of a particular category of a particular game to keep the student challenged in areas where the student has better cognitive skills. The supervisor can prescribe such adaptation through prescription module 224 which is all or part of a computer process executing within supervisor client computer system 104.

Prescription module 224 includes a user interface by which the supervisor can specify adaptations in the behavior of teaching process 202. Prescription module 224 represents the behavioral adaptations specified by the supervisor as configuration data which are forwarded to configuration module 226. When the supervisor has finished specifying changes in the behavior of teaching program 202, the supervisor issues, using graphical user interface techniques, a command to prescription module 224 to transfer the newly created configuration data from configuration module 226 to global student database 210 for subsequent inclusion in configuration database 206. In response thereto, prescription module 224 sends instructions to configuration module 226 which cause configuration module 226 to send the configuration data stored in configuration module 226 to server process 210 for storage in global student database 212.

Server process 210 receives the configuration data from configuration module 226 within supervisor client computer system 104 and incorporates the configuration data into the appropriate student record within global student database 212. The appropriate student record is identified by data which configuration module 226 includes in the configuration data and which identifies the student to which the changes in behavior are prescribed by the supervisor.

Server process 210 updates configuration database 206 to include the configuration data received from configuration module 226. Accordingly, teaching process 202 subsequently exhibits the changes in behavior represented in the configuration data prepared by the supervisor through use of prescription module 224 in the manner described above. Server process 210 updates configuration database 206 by sending, the configuration data to teaching process manager 208 along with instructions directing teaching process manager 208 to include the configuration data in configuration database 206 In one embodiment, server process 210 updates configuration database 206 substantially immediately after receiving the configuration data from configuration module 226. In an alternative embodiment, server process 210 stores data in the appropriate student record of global student database 212 indicating that configuration database 206 requires updating to include the configuration data and updates configuration database 206 at a later time. Such a later time can be a regular daily update time, e.g., during off-peak time when use of student client computer system 102 is unlikely, or when student client computer system 102 indicates to server process 210 that a new session in which a student uses teaching process 202 is about to begin in a registration of the student. Registration of students is described below in greater detail.

Thus, the supervisor (i) reviews specific aspects of the student's use of teaching process 202 through student response data displayed by analysis tools 222 and (ii) prescribes and effects specific changes in the behavior of teaching process 202 to more effectively promote development of the student. Since student client computer systems 102, 102B, and 102C and supervisor client computer system 104 can be geographically dispersed, the supervisor can supervise the progress of multiple students notwithstanding such geographical separation.

With respect to global adaptation of teaching process 202, server computer system 106 includes analysis tools 214 and a reconfirmation module 216. Analysis tools 214 retrieve student records from global student database 212 and compiles statistical information regarding data received from student response database 204 and configuration database 206 and analogous student response and configuration databases of student client computer systems 102B–C (FIG. 1). Analysis tools 214 (FIG. 2) can present the compiled information to a human evaluator for analysis and reconfirmation recommendations in the manner described above with respect to analysis tools 222 or, alternatively, can process the compiled information to automatically formulate reconfirmation recommendations using artificial intelligence and expert systems techniques. For example, analysis tools 214 can provide information regarding specific stimuli of teaching process 202 which elicit incorrect responses in a disproportionate number of cases, suggesting that the specific stimuli are perhaps too challenging for a particular level of a particular category.

Reconfirmation module 216 produces configuration data which causes changes in the behavior of teaching process 202. For example, reconfirmation module 216 can modify data stored in configuration data fields 1510 (FIG. 15) and/or 1608 (FIG. 16) to effect such changes in behavior of teaching process 202 (FIG. 2). In one embodiment, reconfirmation module 216 is responsive to user-generated signals received in response to a human evaluator using graphical user interface techniques in the manner described above with respect to prescription module 224. In an alternative embodiment, reconfirmation module 216 receives statistical information from analysis tools 214 and forms reconfirmation signals using artificial intelligence and/or expert systems techniques. For example, such reconfirmation signals can modify stimuli which elicit incorrect student responses a disproportionate number of times to present a more appropriate level of challenge for the particular level of the particular category.

Student Client Computer Systems Organized in an Intranet

One minor inconvenience of the embodiment of computer-assisted teaching system 100 (FIG. 1) is that each of student client computer systems 102A–C includes respective, separate configuration databases 206 and respective, separate student response databases 204. Accordingly, if a particular student uses teaching process 202 (FIG. 2) of student client computer system 102A, the student response data corresponding to that particular student is stored in student response database 204 and configuration data representing local and remote control adaptation of teaching process 202 specific to that student is stored in configuration database 204. Student response database 204 and configuration database 206 are not directly accessible by student client computer systems 102B–C, and the student therefore cannot easily resume on either of student client computer systems 102B–C a course of study begun on student client computer system 102A.

In some settings, two or more student client computer systems can be set aside for use by students, but consistent use of the same specific student client computer system by each student can pose scheduling problems. One solution is to store student response data and configuration data specific to each student in global student database 212 in real time. The result is that teaching process 202 accesses student response data and configuration data directly within global student database 212 through data read instructions and data write instructions performed by server process 210 on behalf of teaching process 202. Such can provide the local adaptation of teaching process 202 described above with acceptable performance if data transfer rates through computer network 110 (FIG. 1) are sufficiently high and if server process 210 (FIG. 2) serves a sufficiently small number of student client computer systems, e.g., student client computer systems 102A–C, such that server process 210 has sufficient processing bandwidth to satisfy competing data access requests of the student client computer systems. However, even a modest number of student client computer systems served by server process 210 can make such an arrangement infeasible.

Figure 3:
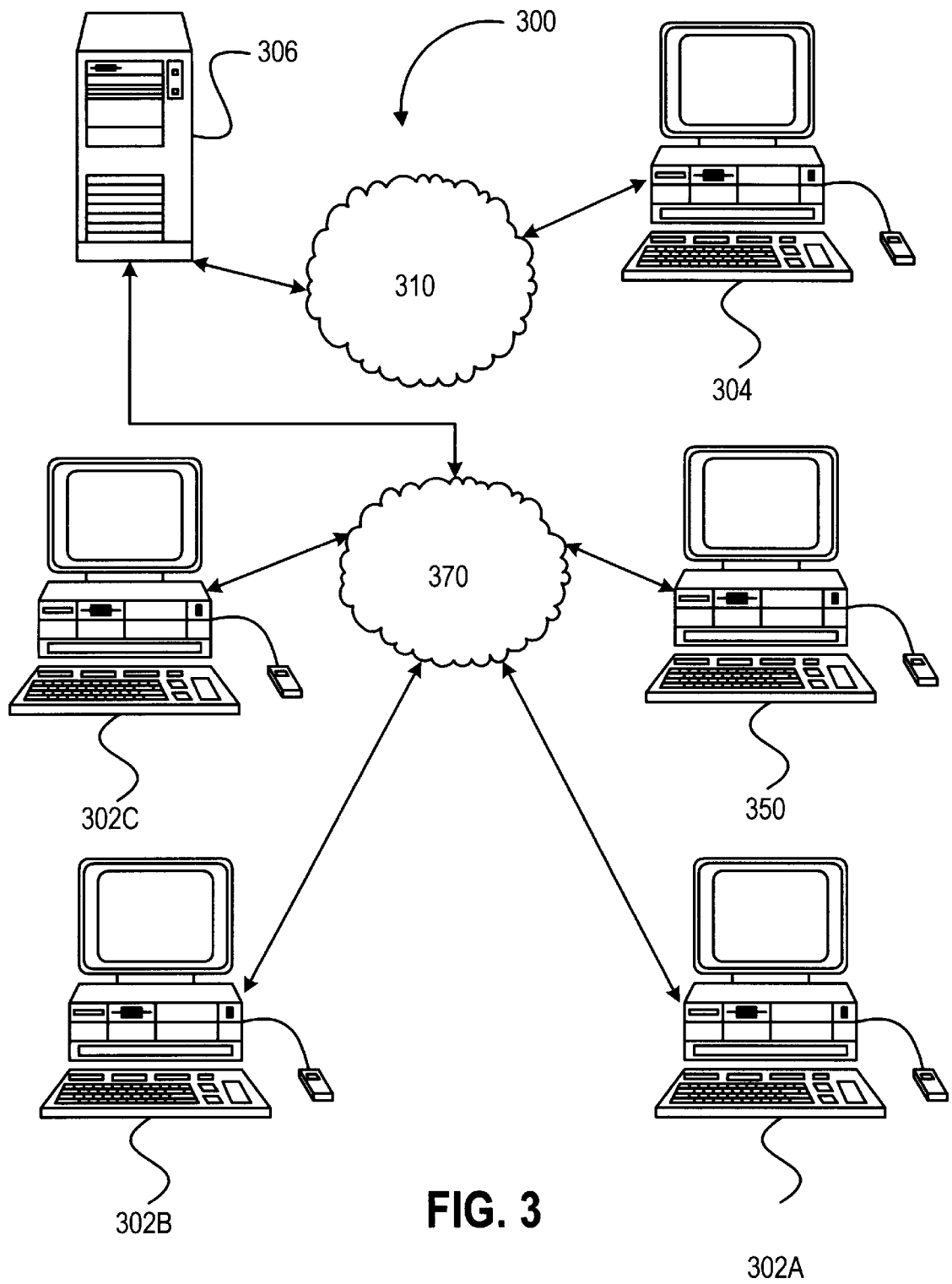
FIG. 3 is a block diagram of a remote server computer system, a number of student client computer systems, a local server computer system, and a supervisor client computer system in which the student client computer systems and local server computer system are coupled to one another through an intranet.

In an alternative embodiment, student client computer systems 302A–C (FIG. 3) are coupled to a local server computer system 350 through an intranet 370. While intranet 370 is described in this illustrative embodiment as an intranet, it is appreciated that intranet 370 can be an extranet in an alternative embodiment since an extranet is merely an intranet which permits limited external access. Teaching processes 402A–C (FIG. 4) execute within student client computer systems 302A–C, respectively, and access student response data within student response database 404 and configuration data within configuration database 406 through intranet 370 (FIG. 3). Accordingly, a student can use teaching process 402A (FIG. 4) and teaching process 402A stores student response data in student response database 404 and accesses configuration data in configuration database 406. The student response data and configuration data which are specific to the student are associated within student response database 404 and configuration database 406, respectively, with an identifier of the student, e.g., the student identifier data stored in identifier field 904 (FIG. 9) of client record 902. The student can subsequently use teaching process 402B (FIG. 4) and teaching process 402B can access student response data and configuration data specific to the student within student response database 404 and configuration database 406, respectively. Thus, local adaptation by teaching process 402A during prior use by a particular student is maintained by either of teaching processes 402B–C during subsequent use by the particular student.

Computer-assisted teaching system 300 (FIG. 3) includes a server computer system 306 and a supervisor client computer system 304 which are coupled to one another through a computer network 310. Server computer system 306, supervisor client computer system 304, and computer network 310 are analogous to server computer system 106 (FIG. 1), supervisor client computer system 104, and computer network 110, respectively. Server computer system 306 (FIG. 3) is also coupled to intranet 370. Computer network 310 and intranet 370 are conventional. Intranet 370 can be a local area TCP/IP network, for example.

Server computer system 306 includes server process 410 (FIG. 4), global student database 412, analysis tools 414, and configuration module 416 which are directly analogous to server process 210 (FIG. 2), global student database 212, analysis tools 214, and configuration module 216, respectively, of server computer system 106. Briefly, server process 410 (FIG. 4) receives student response data and configuration data and stores such data in global student database 412. In addition, analysis tools 414 and configuration module 416 analyze student response data stored in global student database 416 and create configuration data for storage in global student database 412 to effect global adaptation of teaching processing 402, 402B, and 402C in the manner described above with respect to global adaptation of teaching process 202 (FIG. 2).

Supervisor client computer system 304 (FIG. 4) includes a student data fetcher 420, analysis tools 422, a prescription module 424, and a configuration module 426 which are analogous to student data fetcher 220 (FIG. 2), analysis tools 222, prescription module 224, and configuration module 226, respectively, of supervisor client computer system 104. Briefly, analysis tools 422 processes and represents student response data to a human supervisor for evaluation, and prescription module 424 provides a user interface by which the human supervisor can create and/or modify configuration data to specify changes in the behavior of each of teaching processes 402A–C for a particular student. Student data fetcher 420 can fetch student response data and configuration data from global student database 412 in the manner described above with respect to student data fetcher 220 (FIG. 2).

Administration of Student Users

Teaching process manager 408 performs administration tasks in managing use of student client computer systems 302A–C by a number of students. Teaching process manager 408 (FIG. 5) includes a student administration database 502 which in turn includes student administration records 504A–G. Each of student administration records 504A–G represents the status of a respective student authorized to use any of teaching processes 402A–C. Student administration records 504A–G are analogous to one another, and the following description of student administration record 504A is equally applicable to each of student administration records 504B–G.

Figure 4:
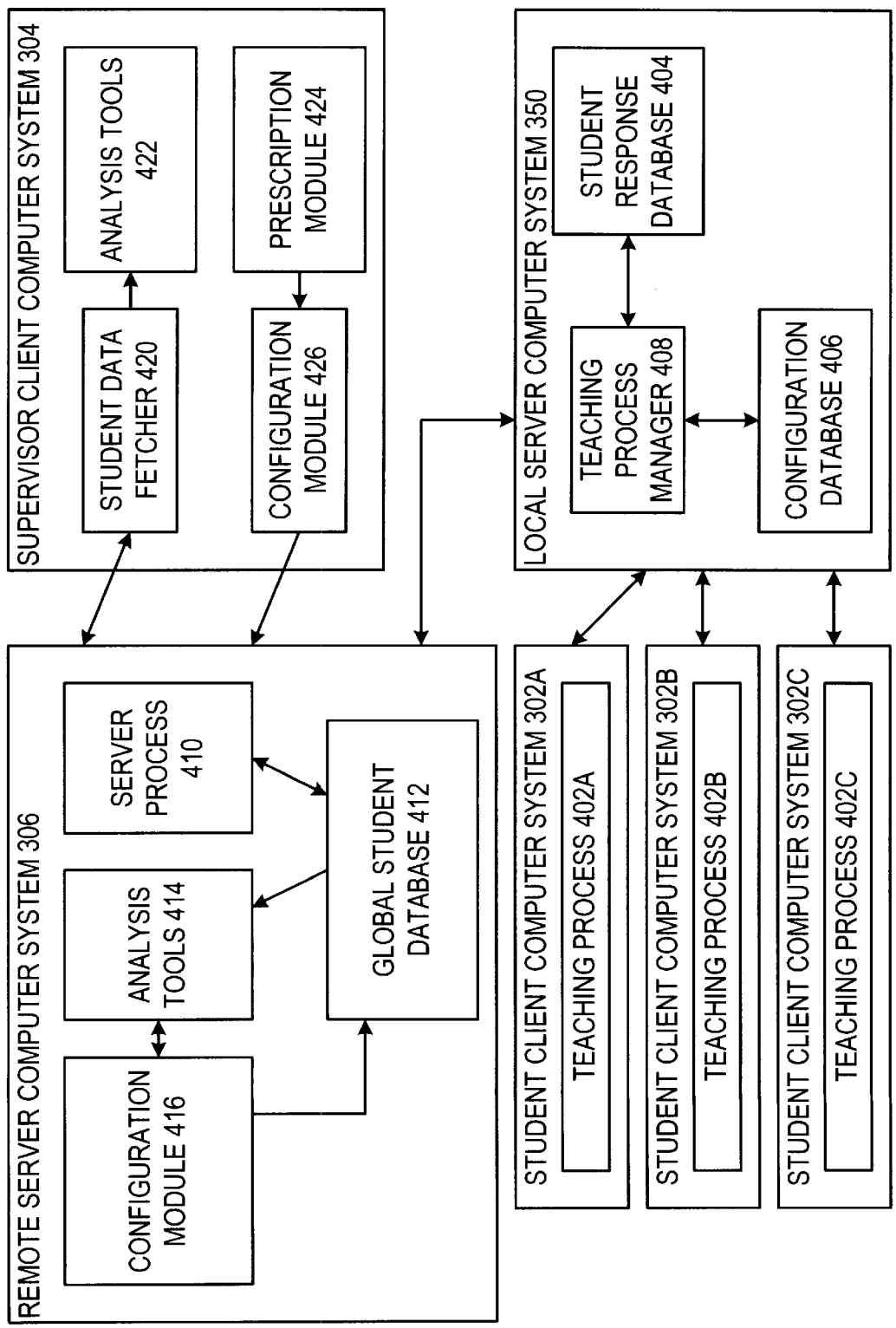
FIG. 4 is a block diagram of the remote and local server computer systems and supervisor and student computer systems of FIG. 3 in greater detail.
Figure 6:
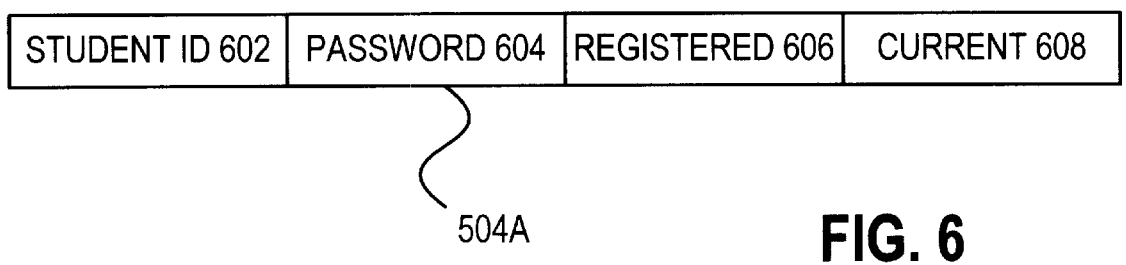
FIG. 6 is a block diagram of a student administration record of FIG. 5 in greater detail.

Student administration record 504A is shown in greater detail in FIG. 6 and includes a student identification field 602, a password field 604, a registered flag 606, and a current flag 608. Each of fields 602–608 stores data representing a component of the administrative state of the student represented by student administration record 504A. Student identification field 602 stores data uniquely identifying the student among all students authorized to use teaching processes 402A–C (FIG. 4). For example, the data can be alphanumeric data representing the student's name or the student's social security number. The student identification data stored in student identification field 602 is identical to the student identification data stored in identifier field 904 (FIG. 9) of client record 902 and identifies the subject student.

Password field 604 (FIG. 6) stores data representing a password by which the subject student is authenticated. Password field 604 can contain predetermined data which indicates no password is required for authentication or can be omitted altogether. The necessity for a password for student authentication is determined by a human administrator through a user interface of teaching process manager 408 (FIG. 4). Such a human administrator preferably knows who has physical access to student client computer systems 302A–C and can therefore determine whether password-based student authentication is required.

Registered flag 606 (FIG. 6) stores data having a boolean value and indicating whether the subject student is currently using one of teaching, processes 402A–C (FIG. 4). Current flag 608 (FIG. 6) stores data having a boolean value and indicating whether student response data stored in student response database 404 (FIG. 4) and configuration data stored in configuration database 406 for the subject student has been uploaded to global student database 412.

To use teaching process 402A, a student (or an administrator assisting the student) causes teaching process 402A to send to teaching, process manager 408 data identifying the student. In one embodiment, the data is entered directly by the student using user interface techniques. In an alternative embodiment, teaching process 420 requests and receives from teaching process manager 408 identifying data for each student authorized to use teaching processes 402A–C as represented in student identification field 602 (FIG. 6) of student administration record 504A and analogous student identification fields in student administration records 504B–G. In this alternative embodiment, the student selects the student's identifier from the list using graphical user interface techniques. Teaching process manager 408 receives the student identification data and grants or denies the student access to teaching process 402A according to logic flow diagram 700 (FIG. 7).

Figure 5:
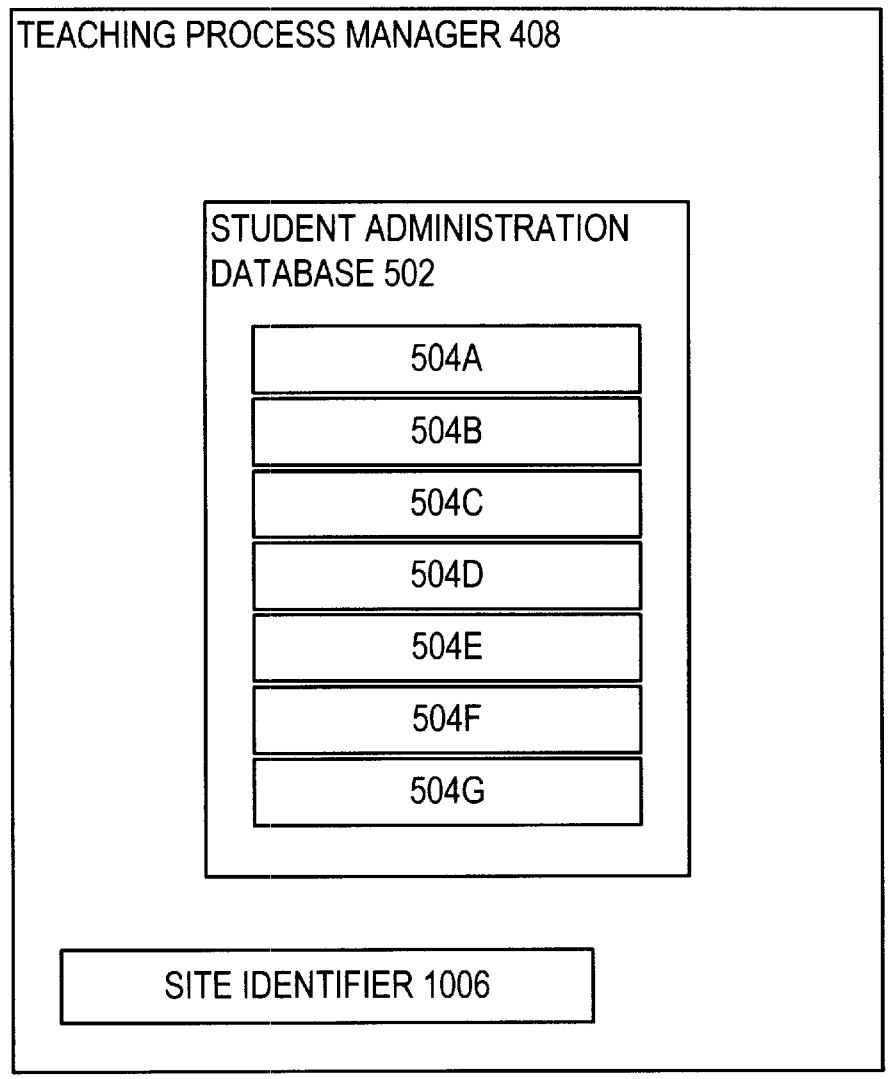
FIG. 5 is a block diagram of a teaching process manager of FIG. 4 in greater detail.

Processing according to logic flow diagram 700 begins in step 702 in which teaching process manager 408 (FIG. 4) receives the student identifying data. In this illustrative example, the received student identification data identifies the subject student, i.e., the student represented by student administration record 504A (FIG. 5). Processing transfers to test step 704 (FIG. 7) in which teaching process manager 408 (FIG. 4) determines whether the identified student is registered. Teaching process manager 408 makes such a determination by retrieving from student administration database 502 (FIG. 5) the one of student administration records 504A–G whose student identification field matches the received student identification data, i.e., retrieving student administration record 504A, and retrieves from that student administration record data stored in registered flag 606 (FIG. 6). Teaching process manager 408 (FIG. 4) compares the data retrieved from registered flag 606 (FIG. 6) to data indicating that the subject student is registered, i.e., is currently using one of teaching processes 402A–C (FIG. 4).

If the subject student is registered. processing by teaching process manager 408 transfers to step 706 (FIG. 7) in which teaching process manager 408 (FIG. 4) refuses the student access to teaching process 402A. Accordingly, the student is not permitted to use more than one of teaching processes 402A–C at any one time. After step 706 (FIG. 7), processing according to logic flow diagram 700 terminates.

Figure 7:
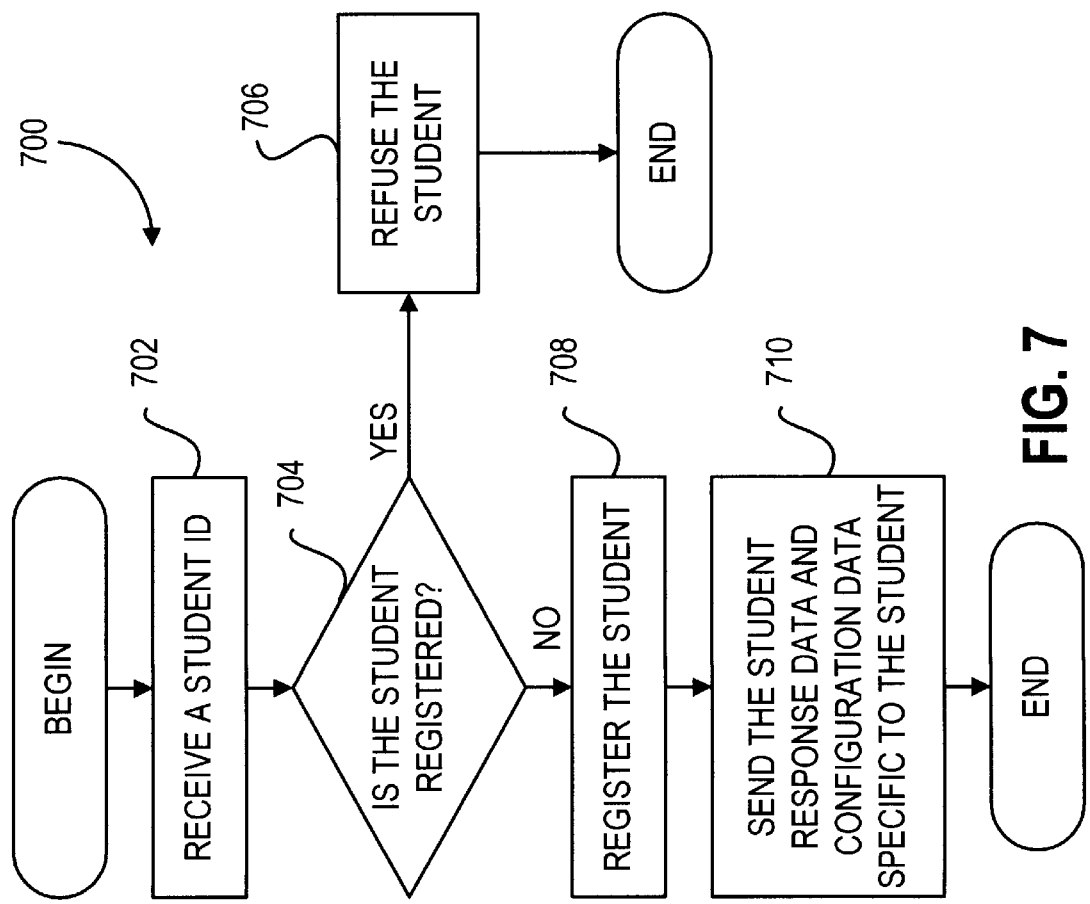
FIG. 7 is a logic flow diagram of the registration of a student by the teaching process manager of FIG. 4.

Conversely, if the subject student is not registered, use of teaching process 402A (FIG. 4) by the subject student is permitted and processing transfers to step 708 (FIG. 7). In step 708, teaching process manager 408 (FIG. 4) registers the student by storing data in registered flag 606 (FIG. 6) data so indicating. Processing transfers to step 710 (FIG. 7) in which teaching process manager 408 (FIG. 4) sends to leaching process 402A student response data for the subject student previously stored in student response database 404 and configuration data for the subject student previously stored in configuration database 406. After step 710 (FIG. 7), processing according to logic flow diagram 700 terminates and the student is permitted to use teaching process 402A (FIG. 4). Since teaching process 402A has received student response data and configuration data specific to the subject student, teaching process 402A retains all previous adaptations of teaching process 402A–C specific to the subject student. In an analogous manner, any adaptations of teaching process 402A during the current use of teaching process 402A by the subject student as represented in student response data and/or configuration data are retained during subsequent uses of any of teaching processes 402A–C.

Figure 8:
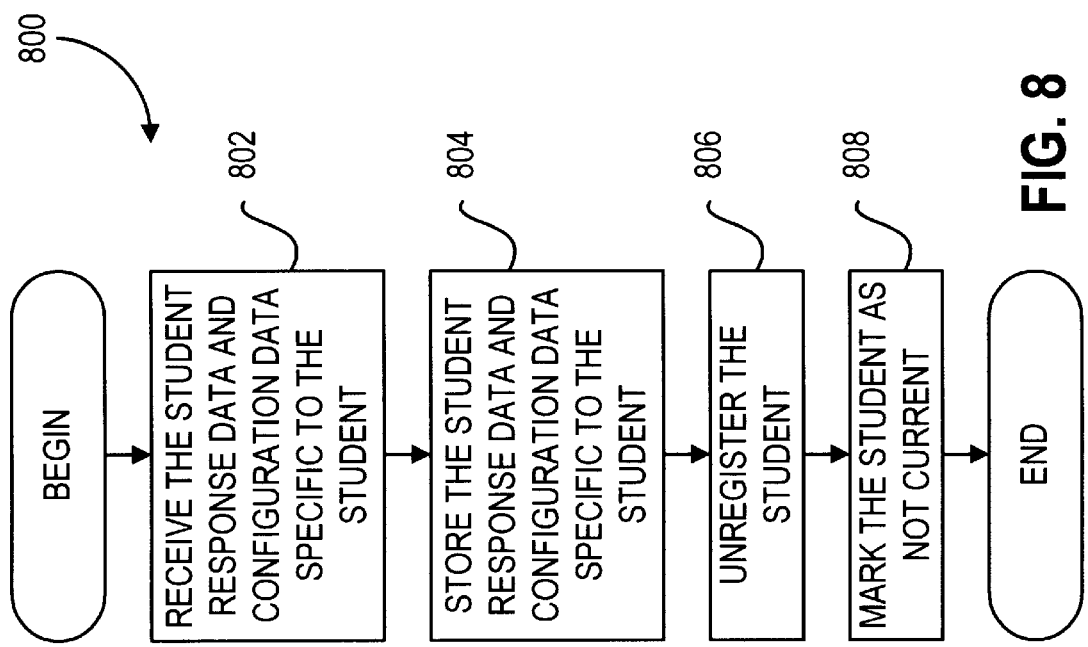
FIG. 8 is a logic flow diagram of the un-registration of a student by the teaching process manager of FIG. 4.

When the subject student has completed use of teaching process 402A, teaching process 402A sends student response data and configuration data specific to the subject student to teaching process manager 408 for inclusion in student response database 404 and configuration database 406, respectively. Processing by teaching process manager 408 in response to receipt of such student response data and configuration data is shown as logic flow diagram 800 (FIG. 8) in which processing begins with step 802.

In step 802, teaching process manager 408 (FIG. 4) receives the student response data and configuration data specific to the subject student. In step 804 (FIG. 8), teaching process manager 408 (FIG. 4) stores the student response data and configuration data in student response database 404 and configuration database 406, respectively. Processing transfers to step 806 (FIG. 8) in which teaching process manager 408 (FIG. 4) un-registers the subject student by storing in registered flag 606 (FIG. 6) data indicating that the subject student is not currently using any of teaching processes 402A–C (FIG. 4). In step 808 (FIG. 8), to which processing transfers from step 806, teaching process manager 408 (FIG. 4) marks the subject student as not current. Specifically, teaching process manager 408 stores in current flag 608 (FIG. 6) data indicating that the student response data and configuration data specific to the subject student may have changed since such data was last uploaded to global student database 412 (FIG. 4). Alternatively, teaching process manager 408 can immediately upload such student response data and configuration data to global student database 412. However, marking the subject student as not current allows teaching process manager 408 to upload such data at a later time, perhaps during off-peak time during which use of computer network 310 (FIG. 3) is relatively light.

Thus, a single human administrator using local server computer system 350 can manage use of several student client computer systems by various students, e.g., through addition, deletion, and/or modification of any of student administration records 504A–G (FIG. 5). In addition, a student can use any of teaching processes 402A–C (FIG. 4) and student response data and configuration data specific to that student are downloaded from teaching process manager 408. Students are not restricted as to which of teaching processes 402A–C they can use.

In one embodiment, teaching process manager 408 is implemented as a common gateway interface (CGI) between a hypertext markup language (HTML) document and a computer process executing within local server computer system 350 (FIG. 3). In addition, intranet 370 is a TCP/IP intranet and firewall 360 authorizes limited access through intranet 370 to teaching process manager 408. In this illustrative embodiment, administration of teaching processes 402A–C through addition, deletion, and/or modification of any of student administration records 504A–G can be performed remotely, e.g., either by the supervisor using supervisor client computer system 304 or by a user of server computer system 306. In addition, since TCP/IP is supported by a number of different computer system platforms, student client computer systems 302A–C can be heterogeneous. For example, student client computer systems 302A–C can be (i) a personal computer compatible with the IBM PC personal computer available from International Business Machines, Inc. of Somers, N.Y. and based on the Pentium series of microprocessors available from Intel Corporation of Santa Clara, Calif. (ii) a Macintosh computer system available from Apple Computer, Inc. of Cupertino, Calif. and (iii) a workstation computer system such as the SPARCstation available from Sun Microsystems, Inc. of Palo Alto, Calif. executing the ubiquitous UNIX operating system, respectively.

Student Migration between Student Client (Computer Systems 102A–C

Notwithstanding the ability of students to use any of a number of computers systems at a particular site, e.g., any of student client computer systems 302A–C (FIG. 3), it is further desirable that a student can use multiple computer systems at separate sites. For example, it is preferred that a student can use one computer system, e.g., student client computer system 102A (FIG. 1), at one site (e.g., a school or workshop) and subsequently resume training through use of another computer system at home, e.g., student client computer system 102C. At the same time, it is preferable that the student be restricted to use of one computer system at any one time. Otherwise, a single student registration could be potentially used by multiple individual students which not only makes proper charging for use of computer-assisted teaching system 100 particularly difficult but also makes detailed tracking of progress of individual students through a tutorial/remedial learning program particularly difficult. Thus, while a particular student can only be registered for use of computer-assisted teaching system 100 from a particular site, the student is permitted to migrate from one site to another.

Migration generally includes two steps: packing and unpacking. Packing includes collection of all data specific to the migrating student and unregistration of the migrating student from a source site. Unpacking includes installation of all packed data and registration of the migrating student at the destination site. Packing and unpacking are described below in the context of a illustrative example in which a student migrates from student client computer system 102A (FIG. 1) to student client computer system 102C.

Figure 19:
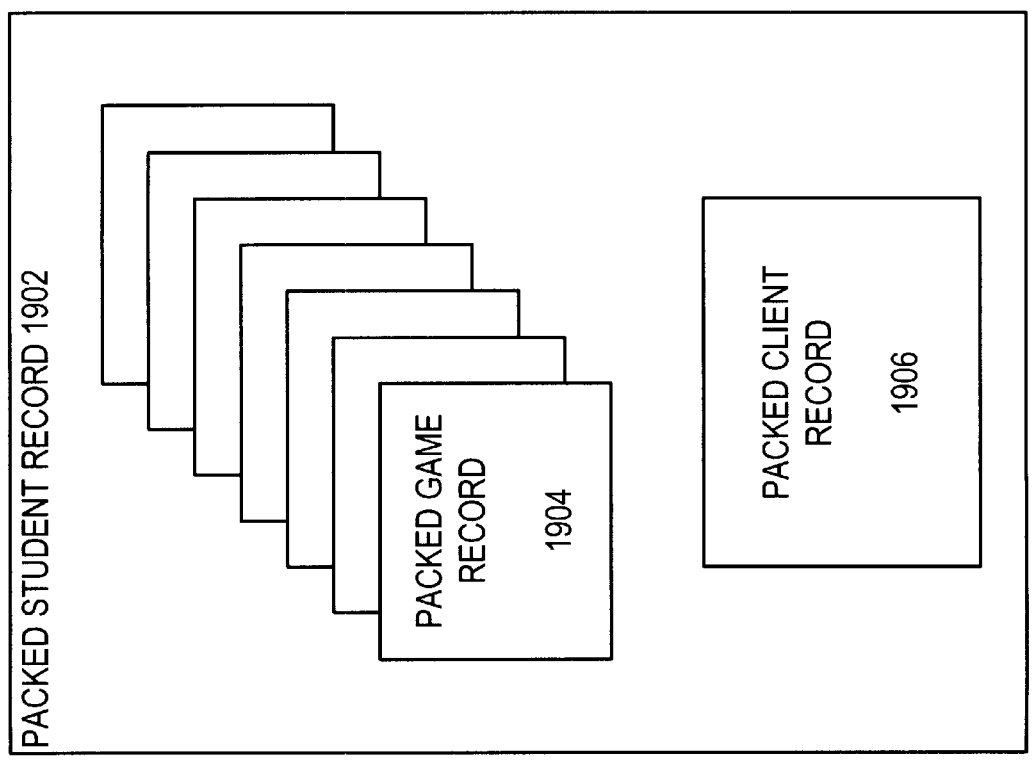
FIG. 19 is a block diagram of a packed student record formed in accordance with the logic flow diagram of FIG. 17.

To pack, the student initiates a packing process within a migration manager 230 (FIG. 2) of student client computer system 102A, processing by which is illustrated as logic flow diagram 1700 (FIG. 17). Processing according to logic flow diagram 1700 begins in step 1702 in which migration manager 230 (FIG. 2) extracts data pertaining to the student from configuration database 206 and from student response database 204. In extracting the data, migration manager 230 stores the data in a compact, portable format and deletes the data from configuration database 206 and from student response database 204. The portable format of the extracted student data is shown in FIGS. 19–20.

Packed student record 1902 (FIG. 19) includes all data extracted from student response database 204 (FIG. 2) and configuration database 206 and is therefore portable. Packed student record 1902 (FIG. 19) can be transported from student client computer system 102A (FIG. 1) to student client computer system 102C in any of a plethora of conventional data transfer techniques including, without limitation, transfer through computer network 110 or by transfer to a portable storage medium such as a floppy disk. Packed student record 1902 includes a number of packed game records 1904, each of which represents the status of play of a particular game by the student. In addition, packed student record 1902 includes a packed client record 1906 which stores client record 902 (FIG. 9) in a portable form. In one embodiment, packed client record 1906 (FIG. 19) is an ASCII text file.

Figure 20:
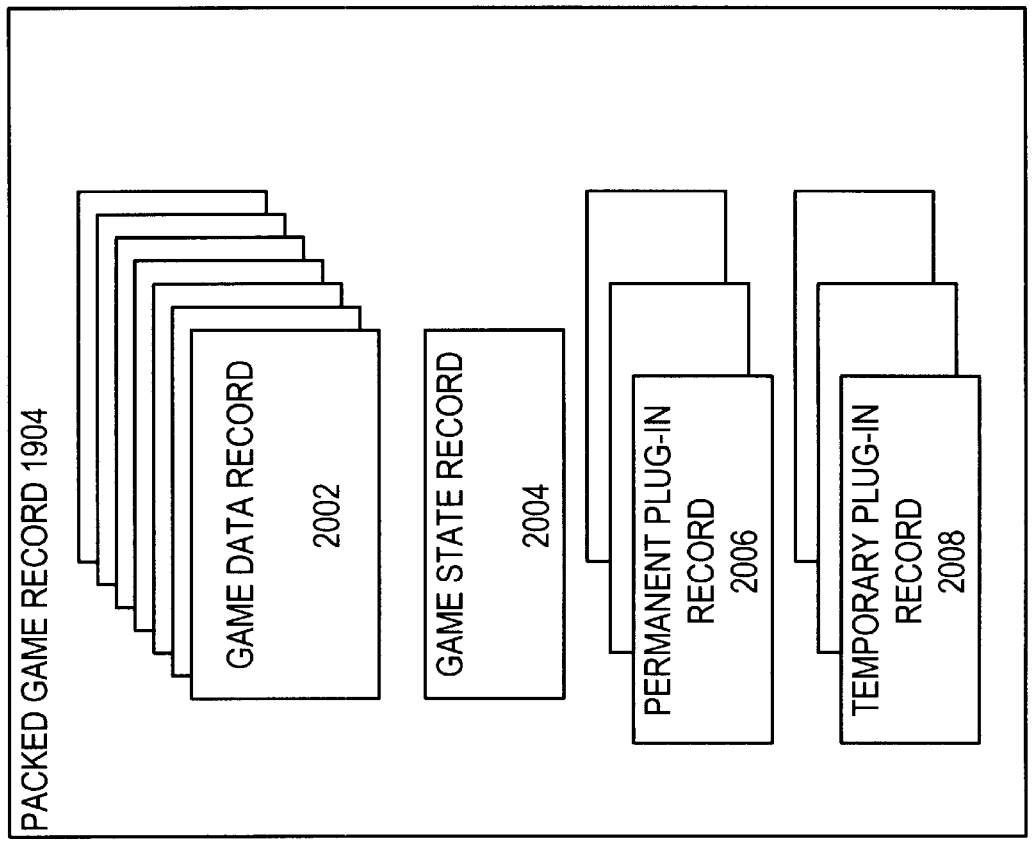
FIG. 20 is a block diagram of a packed game record of the packed student record of FIG. 19.

Packed game records 1904 are analogous to one another and one is shown in greater detail in FIG. 20. Packed game record 1904 includes a number of game data records 2002, a game state record 2004, a number of permanent plug-in records 2006, and a number of temporary plug-in records 2008. In one embodiment, packed student record 1902 (FIG. 19) is a directory, packed game records 1904 are subdirectories of packed student record 1902, and each of game data records 2002 (FIG. 20), game state record 2004, permanent plug-in records 2006, and temporary plug-in records 2008 is a separate data file stored in packed game record 1904. In this illustrative embodiment, the entirety of packed student record 1902 (FIG. 19) can be transported using conventional file management tools which are widely available for transportation of directories of data files.

Each of game data records 2002 (FIG. 20) stores student response data for the game represented by packed game record 1904 for a particular day. In this illustrative embodiment, the number of game data records 2002 is limited to a predetermined number, e.g., seven, such that the student must generally upload student response data to global student database 212 (FIG. 2) periodically.

Game state record 2004 stores data representing the state of the game represented by packed game record 1904 and is derived front game record 1402 (FIG. 14) which is described above.

Permanent plug-in records 2006 and temporary plug-in records 2008 each represent particular components of the behavior of teaching process 202 (FIG. 2) which are specific to the student. In particular, each of permanent plug-in records 2006 (FIG. 20) and temporary plug-in records 2008 can specify data values for any of a number of data variables within teaching process 202 (FIG. 2) which determine components of the behavior of teaching process 202. Permanent plug-in records 2006 (FIG. 20) are persistent and permanently alter the behavior of teaching process 202 (FIG. 2). Temporary plug-in records 2008 (FIG. 20) are temporary and alter the behavior of teaching process 202 (FIG. 2) only once. When initiated, teaching process 202 initializes data variables which define the behavior of teaching process 202. Teaching process 202 then retrieves plug-in data values for specified data variables from all plug-in records for the student currently using teaching process 202 and supersedes the initial value of any specified data variables with any retrieved data values. It a plug-in record is permanent, teaching process 202 leaves the plug-in record in tact such that the superseding data values specified by the plug-in record will be used in the next session with teaching process 202 by the same student. Conversely, if the plug-in record is temporary, teaching process 202 deletes the plug-in record such that teaching process 202 uses the superseding data values only once.

As an example of a use of a permanent plug-in module, data values can be stored in one of permanent plug-in records 2006 (FIG. 20) which marks a particular animation of teaching process 202 as invalid. In this illustrative embodiment, teaching process 202 periodically displays audio/visual animations to the student. If the student is displeased with a particular animation, data can be stored in one of permanent plug-in records 2006 to mark that animation as invalid such that teaching process 202 will never again present that particular animation to that particular student.

Temporary plug-in records 2008 (FIG. 20) implement one-time changes to the behavior of teaching process 202 (FIG. 2). For example, the level of the student in a particular game can be adjusted and, since the change takes effect only once, the student is permitted to progress from that level during subsequent play of the particular game.

Thus, plug-in records 2006–2008 and game state data 2004 represent configuration data for a particular game for the student and game data records 2002 represent student response data for the particular game for the student. In addition, packed game records 1904 (FIG. 19) represent such configuration and response data for each of a number of games for the student. Packed student record 1902 therefore contains complete and sufficient information regarding the state of the student's progress through teaching process 202 to be self-contained.

Processing according to logic flow diagram 1700 (FIG. 17) transfers from step 1702 to step 1704. In step 1704, migration manager 230 (FIG. 2) unregisters the student from student response database 204. Accordingly, the student must first unpack according to logic flow diagram 1800 (FIG. 18) prior to continuing use of teaching process 202 (FIG. 2). In one embodiment, migration manager 230 unregisters the student by removing client record 902 (FIG. 9), which represents the student, from student response database 204 (FIG. 2). Accordingly, the student can no longer use teaching process 202 within student client computer system 102A. After step 1704 (FIG. 17) processing according to logic flow diagram 1700 completes. The student can thereafter transfer the extracted student data, e.g., packed student record 1902 (FIG. 19), to student client computer system 102C (FIG. 1).

Since student client computer systems 102A–C are analogous to one another, the steps by which the student unpacks the extracted student data within student client computer system 102C is described in the context of unpacking extracted student data in student client computer system 102A and such description is equally applicable to student client computer systems 102B–C. To unpack the extracted student data, the student initiates an unpack process within migration manager 230 (FIG. 2). The unpack process is illustrated by logic flow diagram 1800 (FIG. 18) in which processing begins with step 1802.

In step 1802, migration manager 230 (FIG. 2) stored the extracted student data of packed student record 1902 (FIG. 19) in student response database 204 and configuration database 206. Step 1802 (FIG. 18) is the inverse of step 1702 (FIG. 17). Processing transfer from step 1802 (FIG. 18) to step 1804. In step 1804, migration manager 230 (FIG. 2) registers the student in student response database 204. In particular, migration manager 230 stores information of packet client record 1906 (FIG. 19) in client record 902 (FIG. 9) within student response database 204 (FIG. 2). Migration manager 230 registers the student with undefined status, e.g., by storing data specifying an invalid status in status field 928 (FIG. 9) of client record 902.

Processing transfers to step 1806 (FIG. 18) in which migration manager 230 (FIG. 2) queries the status of the student from global student database 212. By requiring migration manager 230 to retrieve status information from global student database 212, the student is prevented from unpacking periodically to reset the state of the student to an earlier state to thereby extend use of teaching process 202 without authorization. In one embodiment, for example, global student database 212 stores, as part of the status of each student, a number of days until expiration of a period of permitted use of teaching process 202. If the status of the student is reset by the act of unpacking and is not verified through access to global student database 212, a student could perpetually reset status data to prevent such a period of permitted use from expiring. By retrieving the student status from global student database 212, such perpetual extension of the period of permitted use is prevented. After step 1806 (FIG. 18), processing according to logic flow diagram 1800 completes and the student can use teaching process 202 (FIG. 2).

Thus, the student is permitted to migrate from one of student client computer systems 102A–C to another and yet is prevented from being registers in multiple student client computer systems simultaneously.

Generalization of Compliance Monitoring

Many of the advantages described above for computer-assisted teaching system 100 can be realized in distributed computer monitoring of human activity. Such distributed computer monitoring can include, for example, distributed computer monitoring of vital signs of medical patients and distributed computer compliance monitor of a training program. Such a system is shown in FIG. 21.

Figure 21:
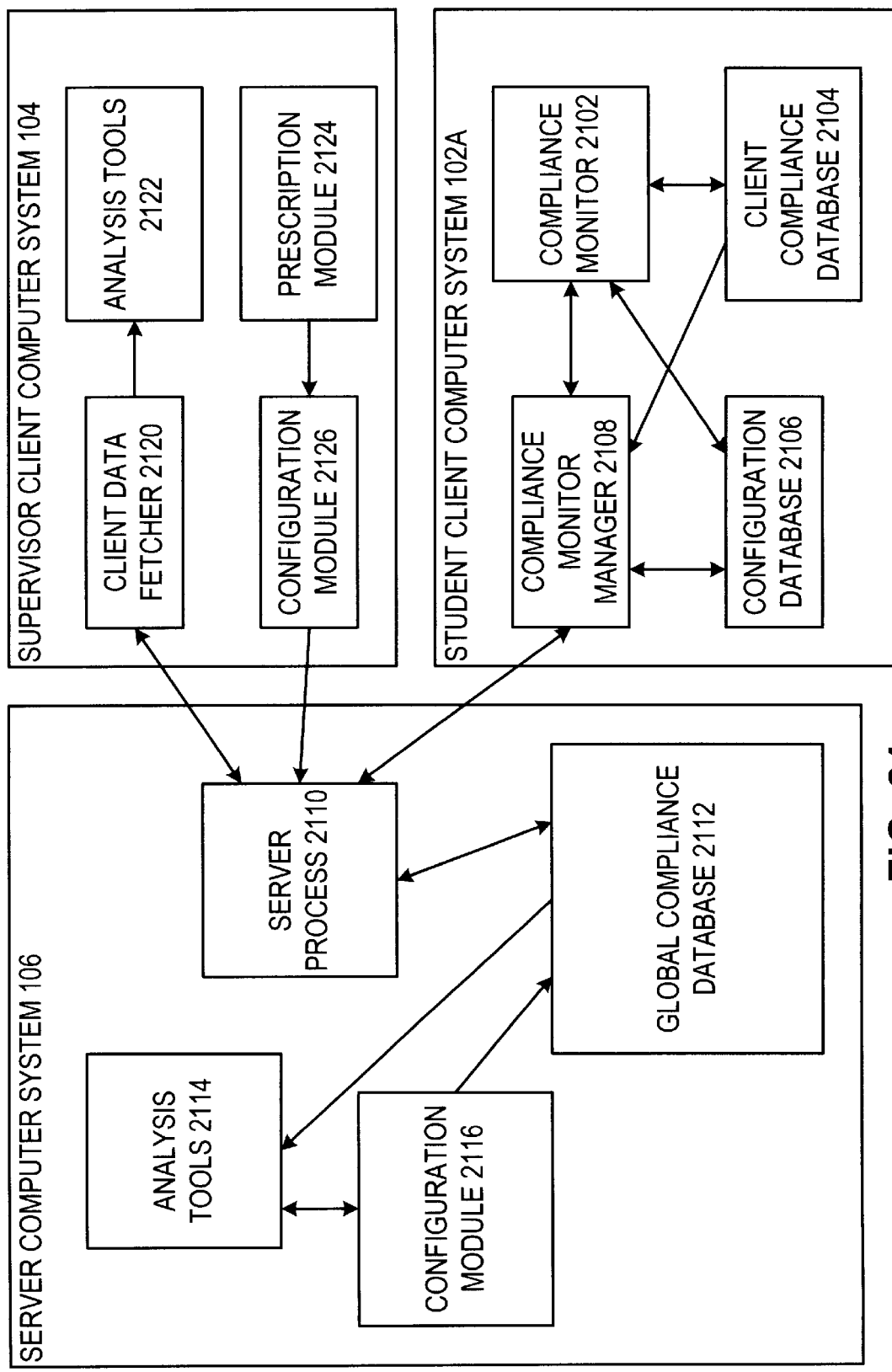
FIG. 21 is a block diagram of a computer-assisted compliance monitoring system in accordance with the present invention.
Figure 22:
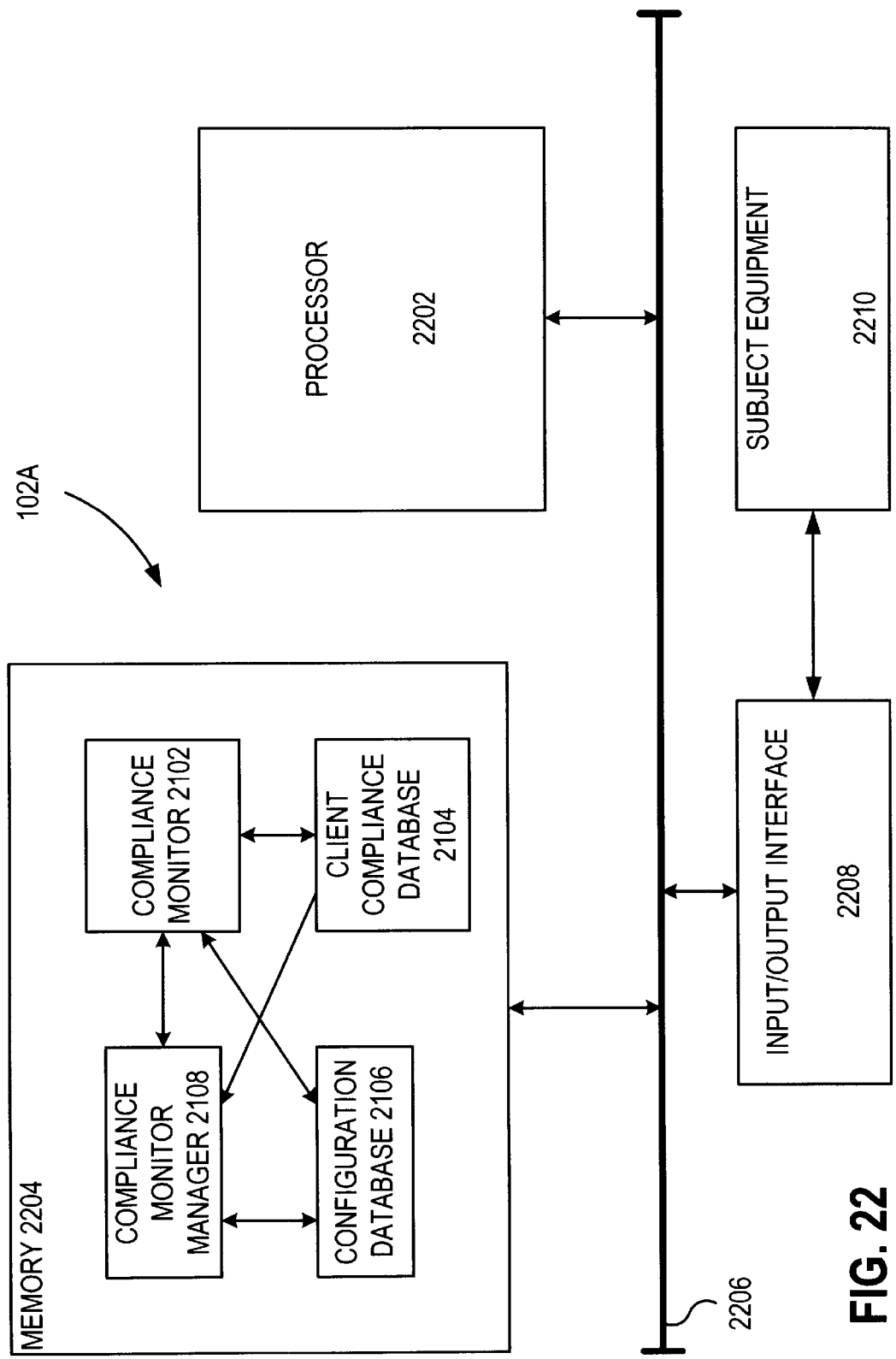
FIG. 22 is a block diagram of the student client computer system of FIG. 21.

In place of teaching process 202 (FIG. 2), student client computer system 102A includes a compliance monitor 2102 (FIG. 21). Compliance monitor 2102 is a computer process which monitors human activity as measured by subject equipment 2210 (FIG. 22). FIG. 22 shows student client computer system 102A in greater detail. Student client computer system 102A includes a processor 2202 and a memory 2204 which are coupled to one another through an interconnect 2206. In this illustrative embodiment, interconnect 2206 is a bus. Memory 2204 can include generally any type of computer memory and can include, for example, read-only memory (ROM), randomly accessible memory (RAM), and storage devices using storage media such as magnetic and/or optical disks. Compliance monitor 2102 executes in processor 2202 from memory 2204.

An input/output (I/O) interface 2208 is coupled through interconnect 2206 to memory 2204 and process 2202. Through I/O interface 2208, compliance monitor 2108 can send data to and receive data from subject equipment 2210. Subject equipment 2210 is a device which directly measures activity of a human client.

The nature of subject equipment 2210 depends upon the nature of the activity measured by compliance monitor 2108. For example, subject equipment 2210 can be an electrocardiograph (EKG) sensor measuring the heartbeat of a medical patient. Alternatively, subject equipment 2210 can be a piece of exercise equipment which includes devices for measuring use of such exercise equipment by a human client. Exercise equipment today frequently includes electronic monitoring equipment which can measure and calculate various types of information regarding use of the equipment. Such information can be as simple as the number of times a particular movement is performed or can be as complex as including, in addition to the number of times a particular movement is performed, the amount of resistance to the movement, the frequency of the movement, discrete position points alone the movement to show the flow of each movement, the heart rate of the human client, and the total amount of time of use of the subject equipment during a single session.

Student client computer system 102A (FIG. 21) includes client compliance database 2104, configuration database 2106, and compliance monitor manager 2108, which are generally analogous to student response database 204 (FIG. 2), configuration database 206, and teaching process monitor 208 as described above. In particular, compliance monitor 2102 (FIG. 21) stores data representing the monitored human activity in client compliance database 2104 and can direct the human client to perform certain activity in accordance with configuration data stored in configuration database 2106. In the illustrative embodiment in which compliance monitor 2102 monitors compliance by a human client to an exercise program, compliance monitor 2102 indicates to the human client a particular exercise program in accordance with (i) programming of compliance monitor 2102 and/or (ii) data stored in configuration database 2106. Such indication can be in the form of a textual description of an exercise regimen for the day or, if subject equipment 2210 is programmable, in the form of instructions to subject equipment 2210. For example, many pieces of exercise equipment allow a user to program an exercise session by specifying a duration of use, a base level of resistance, and a resistance profile which specifies a pattern of varying resistance, e.g., to simulate interval or hill training. For such exercise equipment, such parameters can be programmed directly by compliance monitor 2102 through I/O interface 2208.

Similar to teaching process 202 (FIG. 2), compliance monitor 2102 (FIG. 22) anticipates use by multiple human clients and therefore requires identification of the current human client. In a relatively self-contained environment in which a single human client uses subject equipment 2210, the human client can be identified through graphical user interface techniques directly through compliance monitor 2102. However, in a large installation in which many pieces of subject equipment are used simultaneously, it is preferred that each piece of subject equipment include mechanisms by which human clients can identify themselves immediately prior to use of such subject equipment. Such mechanisms can include, for example, a keypad through which human clients enter a unique numerical code for identification, an electronic identification card reader which retrieve client identification numbers using such card reading mechanisms as bar codes and magnetic strips, or fingerprint recognition devices.

Upon recognition of valid identification of a registered human user, compliance monitor manager 2108 retrieves from configuration database 2106 data defining activity for the human client to perform and indicates such activity to the human client. In an illustrative embodiment, subject equipment 221 0 is a computer processor-controlled piece of exercise equipment such as an exercise bicycle, treadmill, stair-stepper, skier, or climber. A user identifies herself by swiping a gym membership card with a magnetic strip or bar code through a card reader attached to subject equipment 2210. Compliance monitor 2102 receives an identification number retrieved from the card reader and recognizes the user. Compliance monitor 2102 retrieves data representing past performance of the identified user from client compliance database 2104 and configuration database 2106 and can derive a training regimen for the current session according to a training program designed into compliance monitor 2102 and/or specified in configuration database 2106. Compliance monitor 2102 sends data specifying the current session training regimen through I/O interface 2208 to subject equipment 2210. Upon receipt of such data, subject equipment 2210 sets itself for a session according to the data including generally the types of data the user would conventionally enter manually, e.g., session duration, level of effort/resistance/ability, and an effort/resistance/ability profile. Some exercise equipment requires information about the user. For example, many stair-steppers require data representing the weight of the user to properly set a resistance level and such data is conventionally entered manually by the user. Such data can be retrieved from configuration database 2106 by compliance monitor 2102 and supplied to subject equipment 2210 since compliance monitor 2102 has data identifying the human client. The human client can then use subject equipment 2210 as configured by compliance monitor 2102.

During use of subject equipment 2210 by the human client, subject equipment 2210 measures, in a conventional manner, aspects of the use of subject equipment 2210 by the human client. In the illustrative embodiment in which subject equipment 2210 is a stair-stepper, subject equipment measures aspects which include the number of steps by the human client, the relative time of each step, and total elapsed time. From these measured aspects, subject equipment 2210 derives, in a conventional manner, a measure of stair-stepping, speed and the approximate number of calories burned by the human client during the current session. Compliance monitor 2102 retrieves data representing the measured and derived aspects of the human client's use of subject equipment 2210 from subject equipment 2210 through I/O interface 2208 and stores the retrieved data in client compliance database 2104. Thus, compliance monitor 2102 indicates to a human client a prescribed activity and records data representing the human client's compliance with the prescribed activity. In an alternative embodiment, the prescribed activity can be administration of a drug or treatment to the human client, e.g., by a nurse or other health professional, and compliance can be measured as vital signs, e.g., a heartbeat as measured by an EKG monitor, of the human client.

In a manner analogous to that described above with respect to student response database 204 (FIG. 2), server process 210, and global student database 212, compliance monitor manager 2108 (FIG. 21) periodically uploads client compliance data from client compliance database 2104 to global compliance database 2112. Analysis tools 2114 and configuration module 2116 are analogous to analysis tools 214 (FIG. 2) and configuration module 216, respectively, as described above.

In addition, a human supervisor can monitor compliance of the human client with prescribed activity through use of supervisor computer system 104. Client data fetcher 2120, analysis tools 2122, prescription module 2124, and configuration module 2126 are analogous to student data fetcher 220 (FIG. 2), analysis tools 222, prescription module 224, and configuration module 226, respectively, as described above. Briefly, client data fetcher 2120 retrieves client compliance data from global compliance database 2112 and passes the data to analysis tools 2122 through which the supervisor analyzes compliance of the human client. For example, the supervisor can be a personal trainer supervising workout regimens of geographically distributed clients and can prescribe specific exercises or can configure workout sessions involving subject equipment 2210 (FIG. 22). Alternatively, the supervisor can be a medical doctor supervising administration of medical treatments of geographically distributed patients and can prescribed specific treatments and analyze response of the patients to the prescribed treatments as represented by the retrieved compliance data.

The above description is illustrative only and is not limiting. The present invention is limited only by the claims which follow.

What is claimed is:

1. A method for facilitating supervision of a user of a computer process executing within a training computer system, the method comprising:

presenting stimuli to the user;

receiving user response signals generated by the user by physical manipulation of one or more user input devices in response to the stimuli;

storing, in a user response database, user response data representing the user response signals;

forming evaluation data representing a correlation between the user response data and predetermined correct response data for the stimuli;

storing the evaluation data in a server computer system;

receiving, in the server computer system, an analysis request from a supervisor computer system; and in response to the analysis request, sending the evaluation data to the supervisor computer system.

2. The method of claim 1 wherein the step of storing the evaluation data comprises:

storing the evaluation data in the training computer system; and uploading the evaluation data from the training computer system to the server computer system.

3. The method of claim 2 wherein the step of uploading is performed in response to signals generated by the user.

4. The method of claim 1 further comprising:

sending the user response data to the supervisor computer system in response to the analysis request.

5. The method of claim 1 further comprising:

modifying the stimuli according to the evaluation data.

6. A computer system for facilitating supervision of a user of a computer process executing within the computer system, the computer system comprising:

a training computer which includes a teaching process which, when executed, performs the steps of:

presenting stimuli to a user;

receiving user response signals generated by the user by physical manipulation of one or more user input devices in response to the stimuli;

storing, in a user response database, user response data representing the user response signals;

forming evaluation data representing a correlation between the user response data and predetermined correct response data for the stimuli; and sending the evaluation data to a server computer system for storage therein;

a server computer which includes a server process which, when executed, performs the steps of:

receiving, in the server computer system, an analysis request from a supervisor computer; and in response to the analysis request, sending the evaluation data to the supervisor computer.

7. The computer system of claim 6 wherein the teaching process, when executed, performs the additional step of:

storing the evaluation data in the server computer.

8. The computer system of claim 6 wherein the step of sending is performed in response to signals generated by the user.

9. The computer system of claim 6 wherein the server process, when executed, performs the additional step of sending the user response data to the supervisor computer system in response to the analysis request.

10. The computer system of claim 6 wherein the teaching process, when executed, performs the additional step of:

modifying the stimuli according to the evaluation data.

11. A method for supervising a user of a computer process executing within a training computer system, the method comprising:

downloading user response data through a server computer network from a user response data database stored within a server computer system, wherein the user response data is generated by the user in response to stimuli presented to the user by the training computer system and further wherein the user response data is uploaded through a training computer network from the training computer system to the user response data database stored within the server computer system; and analyzing the user response data using a server computer system to assess a condition of the user.

12. The method of claim 11 further comprising:

altering a course of consultation in accordance with the assessed condition of the user.

13. The method of claim 11 whereon the training and server computer networks are the same computer network.

14. A method for training a user of a computer process executing within a training computer system, the method comprising:

presenting stimuli which have at least one characteristic to the user;

receiving user response signals generated by the user by physical manipulation of one or more user input devices in response to the stimuli;

storing, in a user response database, user response data representing the user response signals;

changing the at least one characteristic of the stimuli in accordance with the user response data, receiving configuration data from a server computer system operatively coupled to the training computer system through a computer network, re-presenting the stimuli with the changed at least one characteristic to the user in a manner at least partially specified by the configuration data;

receiving additional user response signals generated by the user by physical manipulation of the one or more user input devices in response to the stimuli with the changed at least one characteristic; and storing, in the user response database, additional user response data representing the additional user response signals.

15. A method for facilitating training of a user of a computer process executing within a training computer system, the method comprising:

presenting, stimuli to the user;

receiving user response signals generated by the user by physical manipulation of one or more user input devices in response to the stimuli;

storing, in a user response database, user response data representing the user response signals;

forming evaluation data representing a correlation between the user response data and predetermined correct response data for the stimuli; and sending the evaluation data to a server computer system for storage in a server database such that the evaluation data can be retrieved from the server database and transferred to a supervisor computer system in response to a request from the supervisor computer system for the evaluation data.

16. A method for facilitating training of a user of a computer process executing within a training computer system, the method comprising:

receiving, from a training computer system, evaluation data which represent a correlation between (i) user response data which in turn represent user generated response signals in response to stimuli and (ii) predetermined correct response data for the stimuli;

storing the evaluation data in a server database in a server computer system;

receiving an analysis request from a supervisor computer system; and in response to the analysis request, sending the evaluation data to the supervisor computer system.

17. The method of claim 16 further comprising:

analyzing the evaluation data to determine a desired change in behavior of the computer process;

forming configuration data which prescribes the desired change; and sending the configuration data to the training computer system such that the computer process exhibits the desired change.

* * * * *